(12) United States Patent
Zhao et al.

(10) Patent No.: US 11,960,690 B2
(45) Date of Patent: Apr. 16, 2024

(54) METHOD FOR FABRICATING TOUCH SUBSTRATE, TOUCH SUBSTRATE, SUBSTRATE AND TOUCH DEVICE

(71) Applicants: Hefei Xinsheng Optoelectronics Technology Co., Ltd., Anhui (CN); BOE TECHNOLOGY GROUP CO., LTD., Beijing (CN)

(72) Inventors: Xue Zhao, Beijing (CN); Xiaodong Xie, Beijing (CN); Min He, Beijing (CN); Tengfei Zhong, Beijing (CN); Xinxiu Zhang, Beijing (CN); Tianyu Zhang, Beijing (CN); Huayu Sang, Beijing (CN)

(73) Assignees: Hefei Xinsheng Optoelectronics Technology Co., Ltd., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 150 days.

(21) Appl. No.: 17/615,133

(22) PCT Filed: Dec. 25, 2020

(86) PCT No.: PCT/CN2020/139497
§ 371 (c)(1),
(2) Date: Nov. 30, 2021

(87) PCT Pub. No.: WO2022/134020
PCT Pub. Date: Jun. 30, 2022

(65) Prior Publication Data
US 2022/0397983 A1 Dec. 15, 2022

(51) Int. Cl.
*G06F 3/041* (2006.01)
*G03D 15/04* (2006.01)
*G06F 3/044* (2006.01)

(52) U.S. Cl.
CPC .......... *G06F 3/0446* (2019.05); *G03D 15/04* (2013.01); *G06F 3/0445* (2019.05); *G06F 2203/04103* (2013.01); *G06F 2203/04112* (2013.01)

(58) Field of Classification Search
CPC ............... G06F 3/0445; G06F 3/0446; G06F 2203/04103; G06F 2203/04112; G03D 15/04
See application file for complete search history.

(56) References Cited

U.S. PATENT DOCUMENTS 10,928,965 B2   2/2021   Ma et al.
2014/0009215 A1  1/2014   Prest et al.
(Continued)

FOREIGN PATENT DOCUMENTS

CN   108321088 A   7/2018
CN   108415621 A   8/2018
(Continued)

OTHER PUBLICATIONS

Zheng et al., (Year: 2019).*

*Primary Examiner* — Deeprose Subedi
(74) *Attorney, Agent, or Firm* — HOUTTEMAN LAW LLC

(57) ABSTRACT

The present disclosure relates to a method for fabricating a touch substrate, a touch substrate and a touch device. The method includes: forming, through a splicing exposure process, a first electrode layer including a metal strip in an edge region thereof and a first metal mesh pattern connected with the metal strip; forming, on one side of the first electrode layer and through a splicing exposure process, a second electrode layer including a metal strip in an edge region thereof and a second metal mesh pattern connected with the metal strip and insulated from the first metal mesh pattern, the metal strip of the first electrode layer directly (Continued)

contacting the metal strip of the second electrode layer to form a metal stack; and forming a wire electrically connected with one of the first and metal mesh patterns of the first and second electrode layers by using the metal stack.

29 Claims, 13 Drawing Sheets

(56) References Cited

U.S. PATENT DOCUMENTS

| | | | |
|---|---|---|---|
| 2014/0307178 A1* | 10/2014 | Tang | G06F 3/0446 |
| | | | 349/12 |
| 2019/0179468 A1* | 6/2019 | Chen | G06F 3/0446 |
| 2019/0189058 A1 | 6/2019 | Cho et al. | |
| 2019/0361281 A1 | 11/2019 | Lu et al. | |
| 2020/0015355 A1 | 1/2020 | Tian et al. | |
| 2020/0103750 A1 | 4/2020 | Zheng et al. | |
| 2021/0364875 A1 | 11/2021 | Wu | |
| 2021/0364914 A1 | 11/2021 | Du et al. | |

FOREIGN PATENT DOCUMENTS

| | | |
|---|---|---|
| CN | 106371294 A | 10/2018 |
| CN | 108803166 A | 11/2018 |
| CN | 109239998 A | 1/2019 |
| CN | 109935186 A | 6/2019 |
| IN | 108761995 A | 11/2018 |

* cited by examiner

METHOD FOR FABRICATING TOUCH SUBSTRATE, TOUCH SUBSTRATE, SUBSTRATE AND TOUCH DEVICE

CROSS-REFERENCE TO RELATED APPLICATION

This is a National Phase application filed under 35 U.S.C. 371 as a national stage of PCT/CN2020/139497, filed on Dec. 25, 2020, the contents of which are incorporated herein in their entirety by reference.

TECHNICAL FIELD

The present disclosure relates to the field of touch technology, and in particular, to a method for fabricating a touch substrate, a touch substrate, a substrate for forming a touch substrate, and a touch device.

BACKGROUND

In recent years, touch devices have been widely used in many electronic devices, such as mobile phones, computer display panels, touch screens, satellite navigation devices, digital cameras, and the like. Examples of touch devices include mutual capacitance touch devices and self-capacitance touch devices. In a mutual capacitance touch device, a touch electrode includes a plurality of touch driving electrodes (Tx) and a plurality of touch sensing electrodes (Rx).

With the continuous development of display technology, the size of the touch panel is continuously increasing. In order to reduce the cost, a splicing exposure process is usually adopted to fabricate a large-size panel, i.e., a large-size substrate is exposed for multiple times with the use of a small-size mask.

SUMMARY

The present disclosure provides a method for fabricating a touch substrate, including:

forming a first electrode layer through a splicing exposure process, the first electrode layer including a metal strip in an edge region of the first electrode layer and a first metal mesh pattern connected with the metal strip;

forming a second electrode layer on one side of the first electrode layer through a splicing exposure process, the second electrode layer including a metal strip in an edge region of the second electrode layer and a second metal mesh pattern connected with the metal strip, the second metal mesh pattern being insulated from the first metal mesh pattern, and the metal strip of the first electrode layer being in direct contact with the metal strip of the second electrode layer to form a metal stack; and forming a wire electrically connected with one of the first metal mesh pattern of the first electrode layer and the second metal mesh pattern of the second electrode layer by using the metal stack.

In an embodiment of the present disclosure, forming the first electrode layer through the splicing exposure process includes:

forming a first conductive film; and performing the splicing exposure process on the first conductive film by using a first mask to form the first electrode layer, the first mask including a first edge region and a first exposure region connected with the first edge region, the first edge region being a strip-shaped light-shielding region, and the first exposure region including light-shielding strips arranged in a grid shape.

In an embodiment of the present disclosure, forming the second electrode layer on one side of the first electrode layer through the splicing exposure process includes:

forming a second conductive film on the one side of the first electrode layer; and performing the splicing exposure process on the second conductive film by using a second mask to form the second electrode layer, the second mask including a third edge region and a second exposure region connected with the third edge region, the third edge region being a light-shielding region, and the second exposure region including light-shielding strips arranged in a grid shape.

In an embodiment of the present disclosure, the first mask further includes a second edge region, the first exposure region connects the first edge region and the second edge region, the second edge region is a light-shielding region, the second mask further includes a fourth edge region, the second exposure region connects the third edge region and the fourth edge region, and the fourth edge region is a light-shielding region, the metal strip of the first electrode layer includes first and second metal strips opposite to each other, and the first metal mesh pattern connects the first and second metal strips, the metal strip of the second electrode layer includes third and fourth metal strips opposite to each other, and the second metal mesh pattern connects the third and fourth metal strips, the third metal strip is in direct contact with the first metal strip to form a first metal stack, and the fourth metal strip is in direct contact with the second metal strip to form a second metal stack, and forming the wire electrically connected with one of the first metal mesh pattern of the first electrode layer and the second metal mesh pattern of the second electrode layer by using the metal stack includes: forming the wire electrically connected with one of the first metal mesh pattern of the first electrode layer and the second metal mesh pattern of the second electrode layer by using the first metal stack and the second metal stack.

In an embodiment of the present disclosure, performing the splicing exposure process on the first conductive film by using the first mask includes:

forming a pattern of the first metal strip by using the first edge region of the first mask during a first exposure; and forming a pattern of the second metal strip by using the second edge region of the first mask during a last exposure.

In an embodiment of the present disclosure, performing the splicing exposure process on the first conductive film by using the first mask further includes:

for any two consecutive exposures, making a position of an edge, which is close to the second edge region, of the first edge region of the first mask in a latter one of the two exposures to be offset relative to a position of an edge, which is close to the first edge region, of the second edge region of the first mask in a former one of the two exposures, so that an area where the first exposure region of the first mask is located in the latter exposure is partially overlapped with an area where the first exposure region of the first mask is located in the former exposure.

In an embodiment of the present disclosure, performing the splicing exposure process on the second conductive film by using the second mask includes:

forming a pattern of the third metal strip by using the third edge region of the second mask during a first exposure, and forming a pattern of the fourth metal strip by using the fourth edge region of the second mask during a last exposure.

In an embodiment of the present disclosure, performing the splicing exposure process on the second conductive film by using the second mask further includes:

for any two consecutive exposures, making a position of an edge, which is close to the fourth edge region, of the third edge region of the second mask in a latter one of the two exposures to be offset relative to a position of an edge, which is close to the third edge region, of the fourth edge region of the second mask in a former one of the two exposures, so that an area where the second exposure region of the second mask is located in the latter exposure is partially overlapped with an area where the second exposure region of the second mask is located in the former exposure.

In an embodiment of the present disclosure, a width of a node of the first exposure region of the first mask, which is connected with the first edge region, is greater than a width of each of the light-shielding strips arranged in the grid shape in the first exposure region.

In an embodiment of the present disclosure, a width of a node of the second exposure region of the second mask, which is connected with the third edge region, is greater than a width of each of the light-shielding strips arranged in the grid shape in the second exposure region.

In an embodiment of the present disclosure, the wire is formed to be electrically connected with the first metal mesh pattern of the first electrode layer, along a direction away from the first edge region of the first mask and/or along a direction away from the third edge region of the second mask, a length of the node of the first exposure region of the first mask, which is connected with the first edge region, is greater than the length of the node of the second exposure region of the second mask, which is connected with the third edge region.

In an embodiment of the present disclosure, the method further includes:

forming a light-shielding film on a base substrate; and performing a splicing exposure process on the light-shielding film by using a fourth mask to form a light-shielding layer, the fourth mask includes a light-transmissive region and a non-light-transmissive region, the light-transmissive region includes a first light-transmissive portion and a second light-transmissive portion opposite to each other, and a third light-transmissive portion and a fourth light-transmissive portion which are opposite to each other and connect the first light-transmissive portion and the second light-transmissive portion, and a distance from an edge of the first light-transmissive portion close to the second light-transmissive portion to an edge of the second light-transmissive portion close to the first light-transmissive portion is larger than 1/N of a preset width of a view area of the touch substrate, where N is the number of exposures of the splicing exposure process using the fourth mask.

In an embodiment of the present disclosure, the view area includes a first region, a second region and a third region which are connected, the splicing exposure process performed on the light-shielding film by using the fourth mask includes a first exposure for the first region, a second exposure for the second region and a third exposure for the third region, during the first exposure, an edge of the second light-transmissive portion of the fourth mask close to the first light-transmissive portion is aligned with a left edge of the first region, an edge of the third light-transmissive portion of the fourth mask close to the fourth light-transmissive portion is aligned with an upper edge of the first region, and an edge of the fourth light-transmissive portion of the fourth mask close to the third light-transmissive portion is aligned with a lower edge of the first region;

during the second exposure, the edge of the third light-transmissive portion of the fourth mask close to the fourth light-transmissive portion is aligned with an upper edge of the second region, the edge of the fourth light-transmissive portion of the fourth mask close to the third light-transmissive portion is aligned with a lower edge of the second region, and the edge of the second light-transmissive portion of the fourth mask close to the first light-transmissive portion is offset to the left relative to an edge of the first light-transmissive portion of the fourth mask close to the second light-transmissive portion during the first exposure by a distance greater than 0 and smaller than (3L−W), where W is the preset width of the view area of the touch substrate, and L is a distance from the edge of the first light-transmissive portion of the fourth mask close to the second light-transmissive portion to the edge of the second light-transmissive portion close to the first light-transmissive portion;

during the third exposure, the edge of the first light-transmissive portion of the fourth mask close to the second light-transmissive portion is aligned with a right edge of the third region, the edge of the third light-transmissive portion of the fourth mask close to the fourth light-transmissive portion is aligned with an upper edge of the third region, and the edge of the fourth light-transmissive portion of the fourth mask close to the third light-transmissive portion is aligned with a lower edge of the third region.

In an embodiment of the present disclosure, the first electrode layer and the second electrode layer are formed on a base substrate. The method further includes:

forming a first insulating layer on a side of the first electrode layer away from the base substrate, an orthographic projection of the first insulating layer on the base substrate being at least partially overlapped with an orthographic projection of the first metal mesh pattern of the first electrode layer on the base substrate, and being not overlapped with an orthographic projection of the first metal strip and the second metal strip of the first electrode layer on the base substrate, and the second electrode layer is formed on a side of the first insulating layer away from the first electrode layer, an orthographic projection of the third metal strip on the base substrate is at least partially overlapped with an orthographic projection of the first metal strip on the base substrate, and an orthographic projection of the fourth metal strip on the base substrate is at least partially overlapped with an orthographic projection of the second metal strip on the base substrate.

In an embodiment of the present disclosure, the orthographic projection of the third metal strip on the base substrate is completely overlapped with the orthographic projection of the first metal strip on the base substrate, and the orthographic projection of the fourth metal strip on the base substrate is completely overlapped with the orthographic projection of the second metal strip on the base substrate.

In an embodiment of the present disclosure, forming the wire electrically connected with one of the first metal mesh pattern of the first electrode layer and the second metal mesh pattern of the second electrode layer by using the first metal stack and the second metal stack includes:

performing a splicing exposure process on the first metal stack and the second metal stack by using a third mask to form the wire electrically connected with one of the first metal mesh pattern of the first electrode layer and the second metal mesh pattern of the second electrode layer, and the third mask includes a wire pattern region, the wire pattern region includes a first wire pattern portion and a second wire pattern portion which are opposite to each other, and a distance from an edge of the first wire pattern portion close to the second wire pattern portion to an edge of the second wire pattern portion close to the first wire pattern portion is greater than a width of the second exposure region of the second mask.

The present disclosure further provides a method for fabricating a touch substrate, including:

forming an electrode layer by a splicing exposure process, the electrode layer including a metal strip at an edge region of the electrode layer and a metal mesh pattern connected with the metal strip, and forming a wire electrically connected with the metal mesh pattern by using the metal strip.

In an embodiment of the present disclosure, forming the electrode layer by the splicing exposure process includes:

forming a conductive film; and performing the splicing exposure process on the conductive film by using a mask to form the electrode layer, the mask including a first edge region and an exposure region connected with the first edge region, the first edge region being a strip-shaped light-shielding region, and the first exposure region including light-shielding strips arranged in a grid shape.

In an embodiment of the present disclosure, the mask further includes a second edge region, the exposure region connects the first edge region and the second edge region, and the second edge region is a strip-shaped light-shielding region, the metal strip includes a first metal strip and a second metal strip which are opposite to each other, and the metal mesh pattern connects the first metal strip and the second metal strip, and forming the wire electrically connected with the metal mesh pattern by using the metal strip includes: forming the wire electrically connected with the metal mesh pattern by using the first metal strip and the second metal strip.

The present disclosure further provides a substrate for forming a touch substrate, including:

a first electrode layer including a metal strip at an edge region of the first electrode layer and a first metal mesh pattern connected with the metal strip, and a second electrode layer at one side of the first electrode layer, the second electrode layer including a metal strip at an edge region of the second electrode layer and a second metal mesh pattern connected with the metal strip of the second electrode layer, the second metal mesh pattern being insulated from the first metal mesh pattern, and the metal strip of the first electrode layer being in direct contact with the metal strip of the second electrode layer to form a metal stack, and the metal stack is used for forming a wire electrically connected with one of the first metal mesh pattern of the first electrode layer and the second metal mesh pattern of the second electrode layer.

In an embodiment of the present disclosure, the metal strip of the first electrode layer includes first and second metal strips opposite to each other, and the first metal mesh pattern connects the first and second metal strips, the metal strip of the second electrode layer includes third and fourth metal strips opposite to each other, and the second metal mesh pattern connects the third and fourth metal strips, the third metal strip is in direct contact with the first metal strip to form a first metal stack, and the fourth metal strip is in direct contact with the second metal strip to form a second metal stack, and the first metal stack and the second metal stack are used for forming the wire electrically connected with one of the first metal mesh pattern of the first electrode layer and the second metal mesh pattern of the second electrode layer.

In an embodiment of the present disclosure, a width of a node of the first metal mesh pattern where the first metal mesh pattern is connected with the metal strip of the first electrode layer is greater than a width of each of metal lines arranged in a grid shape in the first metal mesh pattern, and a width of a node of the second metal mesh pattern where the second metal mesh pattern is connected with the metal strip of the second electrode layer is greater than a width of each of metal lines arranged in a grid shape in the second metal mesh pattern.

In an embodiment of the present disclosure, a length of a node where the first metal mesh pattern is connected with the metal strip of the first electrode layer is greater than a length of a node where the second metal mesh pattern is connected with the metal strip of the second electrode layer, in a direction away from the metal strip of the first electrode layer and/or in a direction away from the metal strip of the second electrode layer.

In an embodiment of the present disclosure, the substrate further includes:

a base substrate, on which the first electrode layer and the second electrode layer are; and a first insulating layer between the first electrode layer and the second electrode layer, an orthographic projection of the first insulating layer on the base substrate being at least partially overlapped with an orthographic projection of the first metal mesh pattern of the first electrode layer on the base substrate, and being not overlapped with orthographic projections of the first metal strip and the second metal strip of the first electrode layer on the base substrate, and an orthographic projection of the third metal strip on the base substrate is at least partially overlapped with the orthographic projection of the first metal strip on the base substrate, and an orthographic projection of the fourth metal strip on the base substrate is at least partially overlapped with the orthographic projection of the second metal strip on the base substrate.

In an embodiment of the present disclosure, the orthographic projection of the third metal strip on the base substrate is completely overlapped with the orthographic projection of the first metal strip on the base substrate, and the orthographic projection of the fourth metal strip on the base substrate is completely overlapped with the orthographic projection of the second metal strip on the base substrate.

The present disclosure further provides a touch substrate, including:

a first electrode layer including a metal strip at an edge region of the first electrode layer and a first metal mesh pattern connected with the metal strip, and a second electrode layer at one side of the first electrode layer, the second electrode layer including a metal strip at an edge region of the second electrode layer and a second metal mesh pattern connected with the metal strip, the second metal mesh pattern being insulated from the first metal mesh pattern, and the metal strip of the first electrode layer being in direct contact with the metal strip of the second electrode layer to form a metal stack, and the metal stack includes a wire electrically connected with one of the first metal mesh pattern of the first electrode layer and the second metal mesh pattern of the second electrode layer.

In an embodiment of the present disclosure, the metal strip of the first electrode layer includes first and second metal strips opposite to each other, and the first metal mesh pattern connects the first and second metal strips, the metal strip of the second electrode layer includes third and fourth metal strips opposite to each other, and the second metal mesh pattern connects the third and fourth metal strips, and the third metal strip is in direct contact with the first metal strip to form a first metal stack, and the fourth metal strip is in direct contact with the second metal strip to form a second metal stack.

In an embodiment of the present disclosure, a width of a node of the first metal mesh pattern where the first metal mesh pattern is connected with the metal strip of the first electrode layer is greater than a width of each of metal lines arranged in a grid shape in the first metal mesh pattern, and a width of a node of the second metal mesh pattern where the second metal mesh pattern is connected with the metal strip of the second electrode layer is greater than a width of each of metal lines arranged in a grid shape in the second metal mesh pattern.

In an embodiment of the present disclosure, the metal stack includes a wire electrically connected with the first metal mesh pattern of the first electrode layer, and a length of the node of the first metal mesh pattern where the first metal mesh pattern is connected with the metal strip of the first electrode layer is greater than a length of the node of the second metal mesh pattern where the second metal mesh pattern is connected with the metal strip of the second electrode layer, in a direction away from the metal strip of the first electrode layer and/or in a direction away from the metal strip of the second electrode layer.

In an embodiment of the present disclosure, the touch substrate further includes:

a base substrate, on which the first electrode layer and the second electrode layer are; and a first insulating layer between the first electrode layer and the second electrode layer, an orthographic projection of the first insulating layer on the base substrate is at least partially overlapped with an orthographic projection of the first metal mesh pattern of the first electrode layer on the base substrate, and is not overlapped with orthographic projections of the first metal strip and the second metal strip of the first electrode layer on the base substrate, and an orthographic projection of the third metal strip on the base substrate is at least partially overlapped with the orthographic projection of the first metal strip on the base substrate, and an orthographic projection of the fourth metal strip on the base substrate is at least partially overlapped with the orthographic projection of the second metal strip on the base substrate.

In an embodiment of the present disclosure, the orthographic projection of the third metal strip on the base substrate is completely overlapped with the orthographic projection of the first metal strip on the base substrate, and the orthographic projection of the fourth metal strip on the base substrate is completely overlapped with the orthographic projection of the second metal strip on the base substrate.

The present disclosure also provides a touch device including the touch substrate according to the present disclosure.

BRIEF DESCRIPTION OF DRAWINGS

In order to more clearly illustrate the technical solutions in the embodiments of the present disclosure, the drawings used in the description of the embodiments will be briefly introduced below. It should be apparent that the drawings in the following description are merely examples of the present disclosure and that other drawings may be derived by those of ordinary skill in the art without creative effort.

DETAIL DESCRIPTION OF EMBODIMENTS

The present disclosure will now be described in more detail with reference to the following examples. It should be noted that the following description of some embodiments is presented herein for purposes of illustration and explanation only. It is not intended to be exhaustive or to be limited to the precise form disclosed.

At present, in splicing exposure, a large-size touch substrate may be divided into a plurality of regions, and the regions are sequentially exposed by using a mask and a baffle, so that the large-size touch substrate is obtained.

Figure 1:
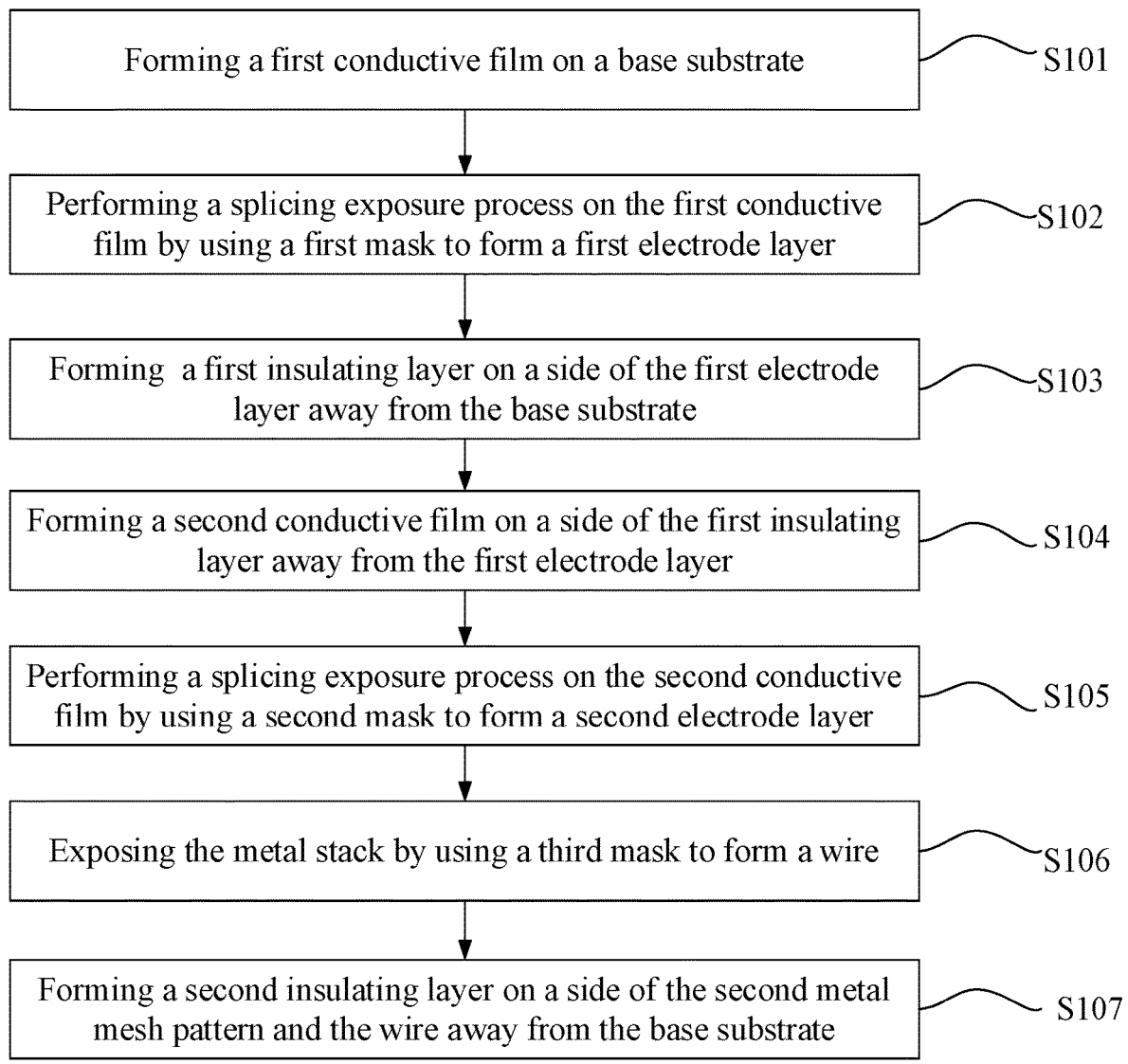
FIG. 1 is a flowchart illustrating a method of fabricating a touch substrate according to an embodiment of the present disclosure.

An embodiment of the present disclosure provides a method for fabricating a touch substrate. As shown in FIG. 1, the method includes steps S101 to S107.

In step S101, a first conductive film is formed on a base substrate.

In this step, the first conductive film may be formed on the base substrate by a sputtering deposition method or a coating method. In some embodiments, the material for forming the first conductive film may be aluminum, copper, or an alloy thereof.

In step S102, a splicing exposure process is performed, by using a first mask, on the first conductive film to form a first electrode layer, and the first electrode layer includes a metal strip located in an edge region of the first electrode layer and a first metal mesh pattern connected with the metal strip. The first mask includes an edge region and an exposure region connected with the edge region, the edge region is a strip-shaped light-shielding region, and the exposure region includes light-shielding strips arranged in a grid shape.

In some embodiments, the metal strip of the first electrode layer includes a first metal strip on one side of the first electrode layer and a first metal mesh pattern connected with the first metal strip; the first mask includes a first edge region on one side of the first mask and an exposure region connected with the first edge region, the first edge region is a strip-shaped light-shielding region, and the exposure region includes light-shielding strips arranged in a grid shape.

In some embodiments, the metal strip of the first electrode layer includes first and second metal strips disposed oppositely and a first metal mesh pattern between the first and second metal strips; the first mask includes a first edge region, a second edge region and a first intermediate exposure region positioned between the first edge region and the second edge region. The first edge region and the second edge region are both strip-shaped light-shielding regions, and the first intermediate exposure region includes light-shielding strips arranged in a grid shape. The shape of the first edge region of the first mask is the same as that of the first metal strip of the first electrode layer, and the shape of the second edge region of the first mask is the same as that of the second metal strip of the first electrode layer. In practical applications, it is desirable that the width of each of the first and second metal strips is as small as possible.

In the step, a photoresist layer (for example, a positive photoresist) is coated on a side of the first conductive film away from the base substrate, a splicing exposure process is performed on the photoresist layer by using the first mask, the exposed photoresist layer is developed to form a first photoresist pattern, and then the first conductive film is etched by using the first photoresist pattern to form the first electrode layer with a metal mesh structure. The first electrode layer may be a touch driving electrode or a touch sensing electrode.

Figure 2:
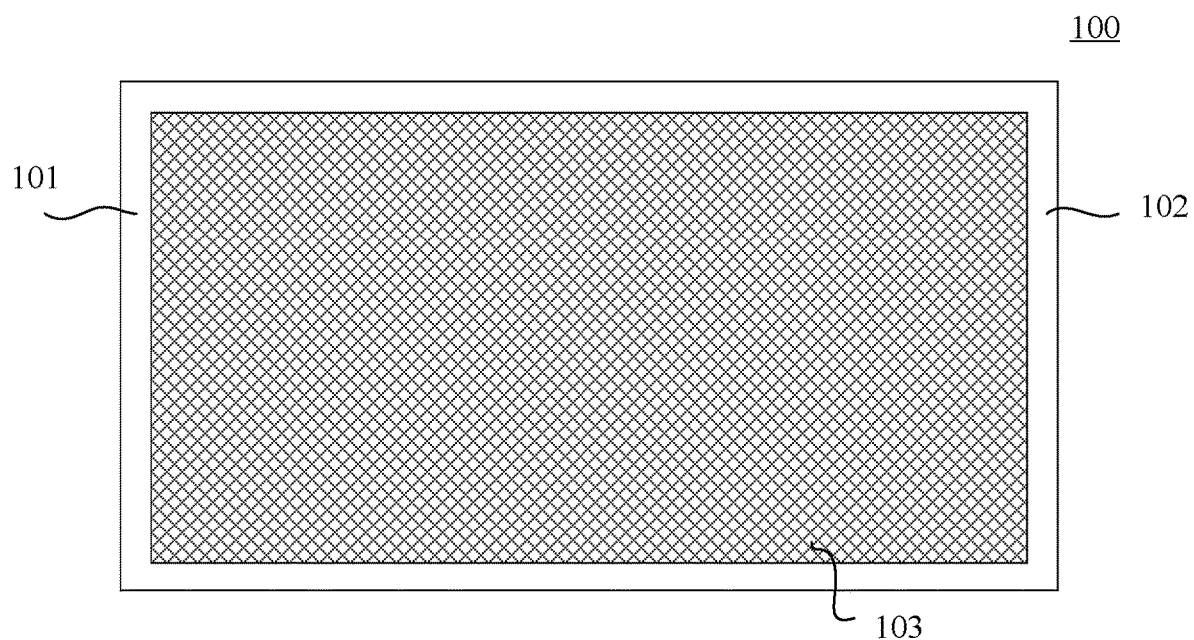
FIG. 2 is a schematic diagram illustrating a first electrode layer according to an embodiment of the present disclosure.

FIG. 2 is a schematic diagram illustrating a first electrode layer according to an embodiment of the present disclosure. As shown in FIG. 2, the first electrode layer 100 includes first and second metal strips 101 and 102 and a first metal mesh pattern 103 between the first and second metal strips 101 and 102.

Figure 3A:
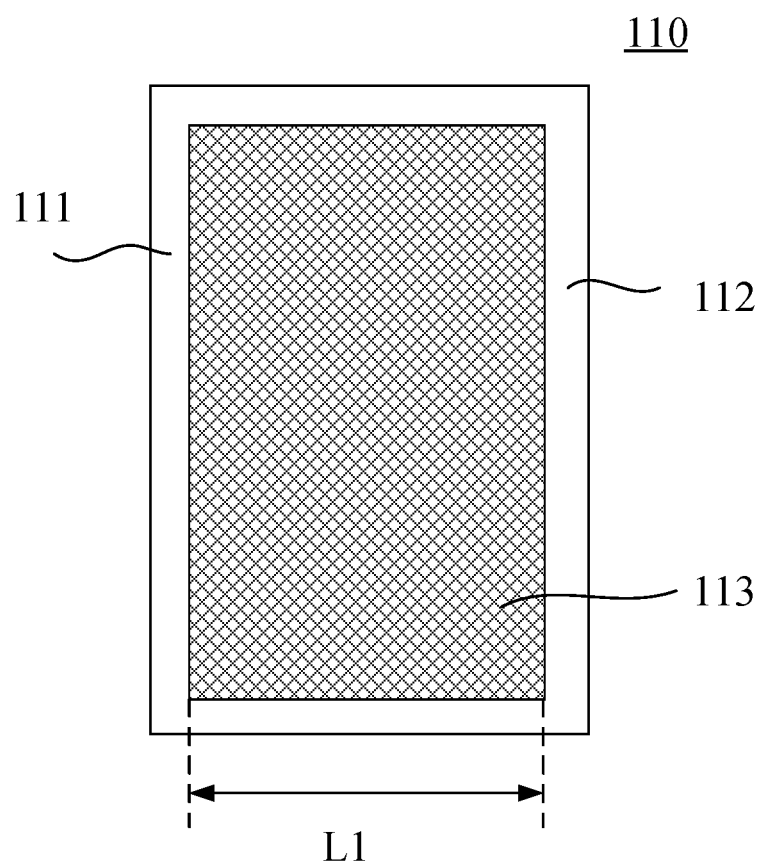
FIG. 3A is a schematic diagram illustrating a first mask according to an embodiment of the present disclosure.

FIG. 3A is a schematic diagram illustrating a first mask according to an embodiment of the present disclosure. As shown in FIG. 3A, the first mask 110 includes a first edge region 111 and a second edge region 112 and a first intermediate exposure region 113 between the first edge region 111 and the second edge region 112.

Figure 4:
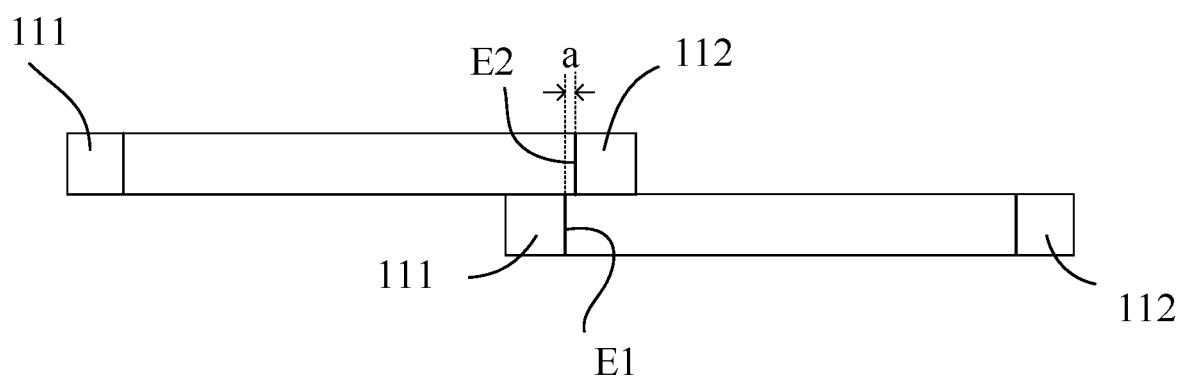
FIG. 4 is a side view schematically illustrating relative positions of the first mask in two consecutive exposures during a splicing exposure process performed using the first mask.

When the splicing exposure is performed, a touch electrode area of the base substrate may be divided into a plurality of regions, and then the regions are sequentially exposed by adopting the first mask. For example, in the case of performing the splicing exposure including three exposures, the base substrate is divided into three regions of the same size in a first direction (for example, a longitudinal direction), and the three regions of the same size of the base substrate are sequentially exposed using the first mask. FIG. 4 is a side view schematically illustrating relative positions of the first mask in two consecutive exposures when a splicing exposure process is performed using the first mask. As shown in FIG. 4, an orthographic projection of an edge E1, close to the second edge region 112, of the first edge region 111 of the first mask on the base substrate at the time of performing the latter exposure is offset relative to an edge E2, close to the first edge region 111, of the second edge region 112 of the first mask at the time of performing the former exposure, so that an area where the first intermediate exposure region 113 of the first mask is located at the time of performing the latter exposure is partially overlapped with an area where the first intermediate exposure region 113 of the first mask is located at the time of performing the former exposure. The width 'a' of the overlapped region is less than 100 μm.

A pattern of the first metal strip 101 is formed by using the first edge region 111 of the first mask 110 at the time of performing the first exposure, and a pattern of the second metal strip 102 is formed by using the second edge region 112 of the first mask 110 at the time of performing the last exposure.

In the embodiment of the present disclosure, in order to ensure that the metal mesh patterns formed in the first conductive film after two consecutive exposures in the splicing exposure process can be effectively connected, the width of the node of the first intermediate exposure region 113 of the first mask 110 where the first intermediate exposure region 113 is connected with and in direct contact with the first edge region 111 may be designed to be greater than the width of each of the light-shielding strips arranged in the grid shape in the first intermediate exposure region 113, and the width of the node of the first intermediate exposure region 113 of the first mask 110 where the first intermediate exposure region 113 is connected with and in direct contact with the second edge region 112 may be designed to be greater than the width of each of the light-shielding strips arranged in the grid shape in the first intermediate exposure region 113.

Figure 3B:
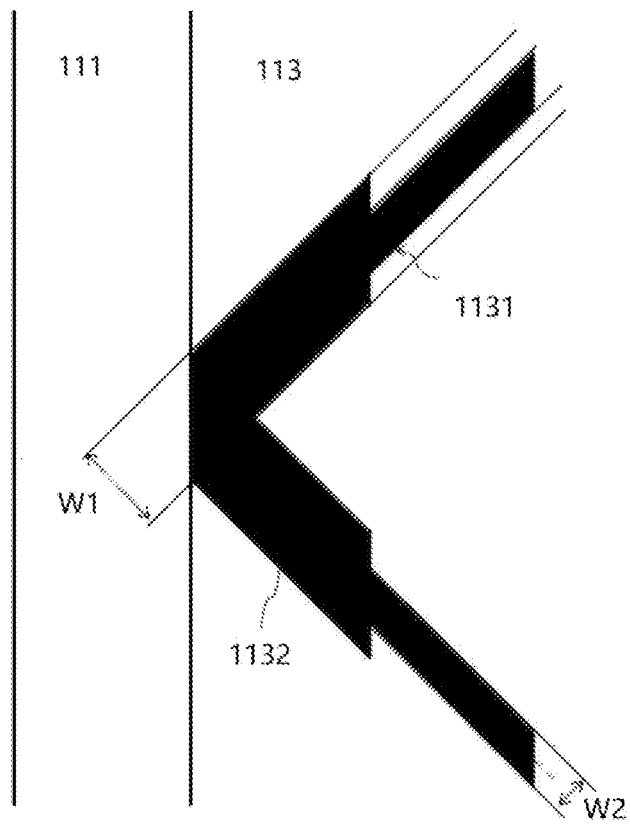
FIG. 3B is a partially enlarged view illustrating a node of a first intermediate exposure region of the first mask, which is connected with a first edge region, according to an embodiment of the present disclosure.

As shown in FIG. 3B, the width W1 of the node 1132 of the first intermediate exposure region 113 of the first mask 110 connected and in direct contact with the first edge region 111 is greater than the width W2 of each of the light-shielding strips 1131 arranged in the grid shape in the first intermediate exposure region 113. Similarly, the width of the node of the first intermediate exposure region 113 of the first mask 110 connected and in direct contact with the second edge region 112 is greater than the width of each of the light-shielding strips arranged in the grid shape in the first intermediate exposure region 113. In the embodiments of the present disclosure, W1 is less than 100 um, and W2 is less than 8 um. The difference between W1 and W2 may be set according to actual process conditions.

In step S103, a first insulating layer is formed on a side of the first electrode layer away from the base substrate. An orthographic projection of the first insulating layer on the base substrate is at least partially overlapped with an orthographic projection of the first metal mesh pattern of the first electrode layer on the base substrate, and is not overlapped with an orthographic projection of the metal strip of the first electrode layer on the base substrate.

In this step, the first insulating layer is formed only at the region corresponding to the first metal mesh pattern of the first electrode layer, and is not formed at the regions corresponding to the first and second metal strips of the first electrode layer. In a case where a portion of the first metal mesh pattern of the first electrode layer, which is adjacent to the metal strip, is a dummy electrode, the first insulating layer may not cover the node of the first metal mesh pattern of the first electrode layer, which is connected with the metal strip.

In step S104, a second conductive film is formed on a side of the first insulating layer away from the first electrode layer.

In this step, the second conductive film may be formed on the base substrate by a sputtering process. The material for forming the second conductive film may be aluminum, copper, or an alloy thereof.

In step S105, a splicing exposure process is performed on the second conductive film by using a second mask to form a second electrode layer, the second electrode layer includes a metal strip located in an edge region of the second electrode layer and a second metal mesh pattern connected with the metal strip, the second metal mesh pattern is insulated from the first metal mesh pattern, and the metal strip of the first electrode layer is in direct contact with the metal strip of the second electrode layer to form a metal stack.

Since the first insulating layer is formed only at the region corresponding to the first metal mesh pattern of the first electrode layer, and is not formed at the region corresponding to the metal strip of the first electrode layer, the metal strip of the first electrode layer is in direct contact with the metal strip of the second electrode layer to form the metal stack.

In some embodiments, the metal strip of the second electrode layer includes a third metal strip on one side of the second electrode layer and a second metal mesh pattern connected with the third metal strip; the second mask includes a third edge region located on one side of the second mask and an exposure region connected with the third edge region, the third edge region is a strip-shaped light-shielding region, and the exposure region includes light-shielding strips which are arranged in a grid shape.

In some embodiments, the metal strip of the second electrode layer includes third and fourth metal strips disposed oppositely and a second metal mesh pattern between the third and fourth metal strips. In some embodiments, the third metal strip is in direct contact with the first metal strip to form a first metal stack, and the fourth metal strip is in direct contact with the second metal strip to form a second metal stack. In some embodiments, an orthographic projection of the third metal strip on the base substrate is at least partially overlapped with an orthographic projection of the first metal strip on the base substrate, and an orthographic projection of the fourth metal strip on the base substrate is at least partially overlapped with an orthographic projection of the second metal strip on the base substrate. In some embodiments, the orthographic projection of the third metal strip on the base substrate is completely overlapped with the orthographic projection of the first metal strip on the base substrate, and the orthographic projection of the fourth metal strip on the base substrate is completely overlapped with the orthographic projection of the second metal strip on the base substrate. In practical applications, it is desirable that the widths of the third and fourth metal strips are as small as possible. The second mask includes a third edge region, a fourth edge region and a second intermediate exposure region positioned between the third edge region and the fourth edge region. The third edge region and the fourth edge region are both strip-shaped light-shielding regions, and the second intermediate exposure region includes light-shielding strips arranged in a grid shape. The shape of the third edge region of the second mask is the same as that of the third metal strip of the second electrode layer, and the shape of the fourth edge region of the second mask is the same as that of the fourth metal strip of the second electrode layer.

In this step, a photoresist layer (e.g., a positive photoresist) is coated on a side of the second conductive film away from the base substrate, a splicing exposure process is performed on the photoresist layer by using the second mask, the exposed photoresist layer is developed to form a second photoresist pattern, and then the second conductive film is etched by using the second photoresist pattern to form the second electrode layer with a metal mesh structure. The second electrode layer may be a touch driving electrode or a touch sensing electrode. In some embodiments, the first metal mesh pattern of the first electrode layer is a touch driving electrode, and the second metal mesh pattern of the second electrode layer is a touch sensing electrode. In some other embodiments, the first metal mesh pattern of the first electrode layer is a touch sensing electrode, and the second metal mesh pattern of the second electrode layer is a touch driving electrode.

Figure 5:
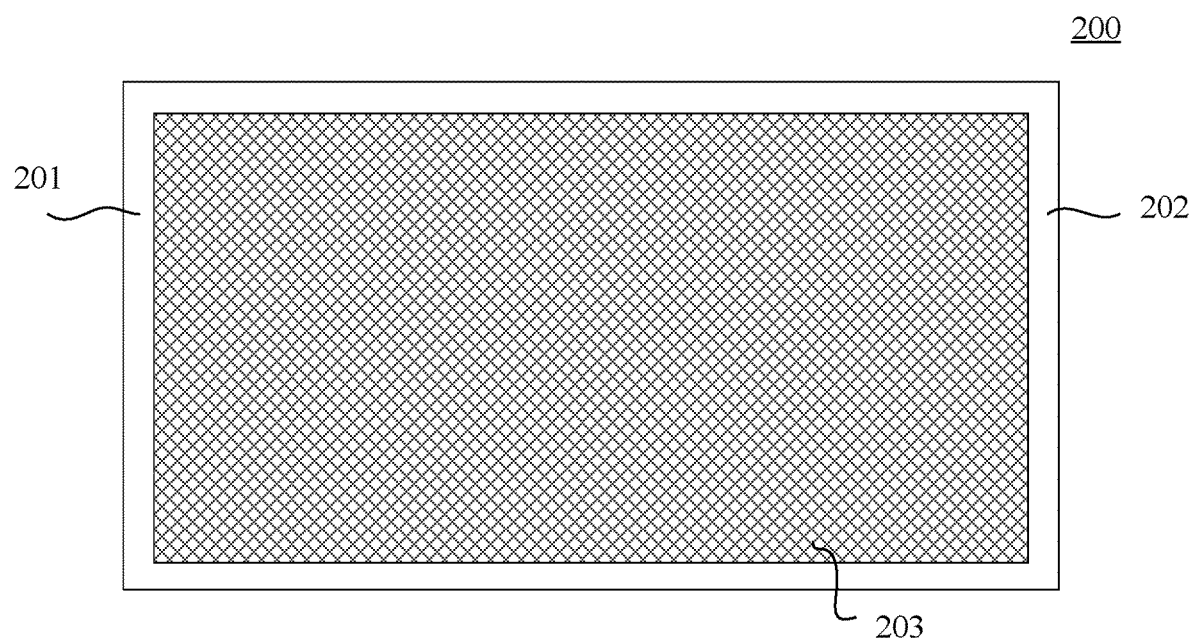
FIG. 5 is a schematic diagram illustrating a second electrode layer according to an embodiment of the present disclosure.

FIG. 5 is a schematic diagram illustrating a second electrode layer according to an embodiment of the present disclosure. As shown in FIG. 5, the second electrode layer 200 includes third and fourth metal strips 201 and 202, and a second metal mesh pattern 203 between the third and fourth metal strips 201 and 202.

Figure 6A:
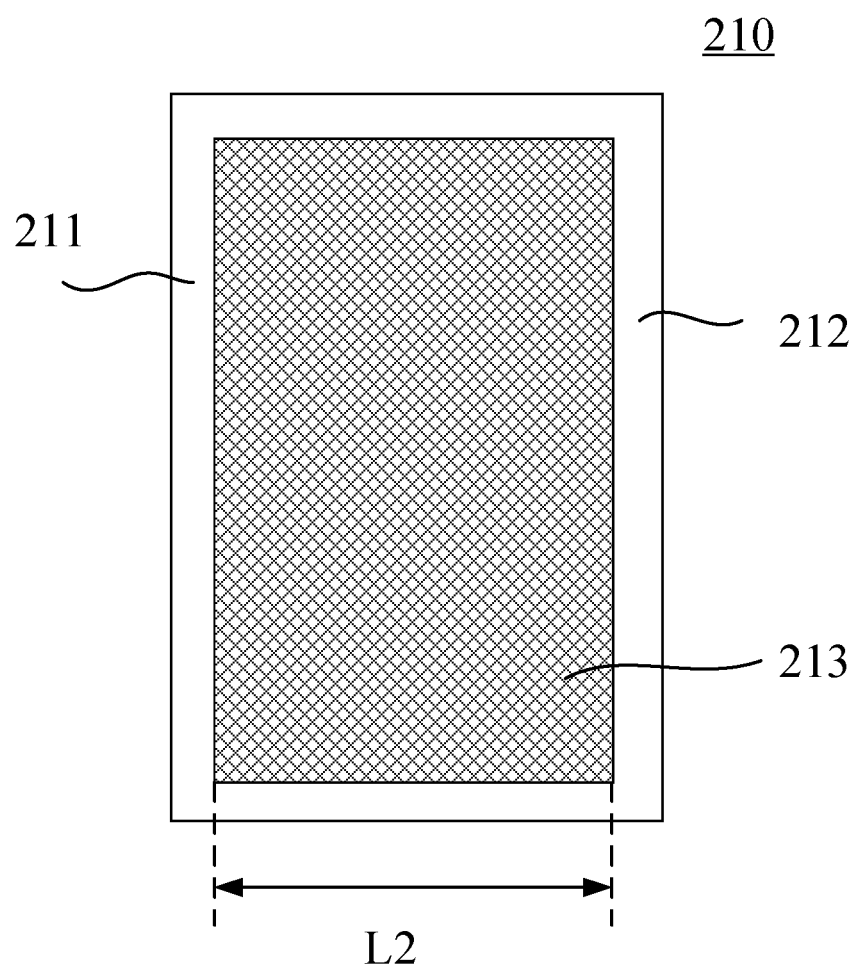
FIG. 6A is a schematic diagram illustrating a second mask according to an embodiment of the present disclosure.

FIG. 6A is a schematic diagram illustrating a second mask according to an embodiment of the present disclosure. As shown in FIG. 6A, the second mask 210 includes third and fourth edge regions 211 and 212, and a second intermediate exposure region 213 between the third and fourth edge regions 211 and 212.

Figure 7:
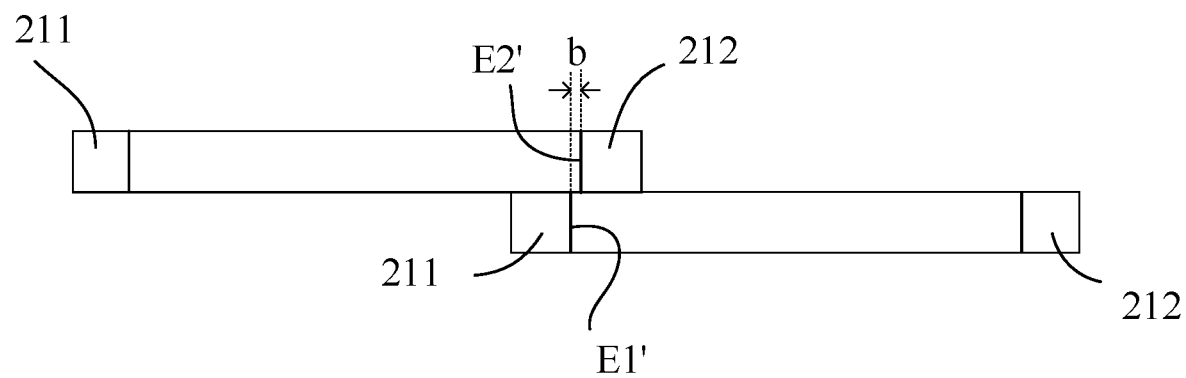
FIG. 7 is a side view schematically illustrating relative positions of the second mask in two consecutive exposures during a splicing exposure process performed using the second mask.

When the splicing exposure is performed, the touch electrode area of the base substrate may be divided into a plurality of regions, and then the regions are sequentially exposed by adopting the second mask. For example, in the case of performing the splicing exposure including three exposures, the base substrate is divided into three regions of the same size in the first direction (for example, the longitudinal direction), and the three regions of the same size of the base substrate are sequentially exposed using the second mask. FIG. 7 is a side view schematically illustrating relative positions of a second mask in two consecutive exposures when a splicing exposure process is performed using the second mask. As shown in FIG. 7, an orthographic projection of an edge E1', close to the fourth edge region 212, of the third edge region 211 of the second mask on the base substrate in the latter exposure is offset relative to an edge E2', close to the third edge region 211, of the fourth edge region 212 of the second mask in the former exposure, so that the area where the second intermediate exposure region 213 of the second mask is located in the latter exposure is partially overlapped with the area where the second intermediate exposure region 213 of the second mask is located in the former exposure. The width b of the overlapped area is less than 100 um.

The pattern of the third metal strip 201 is formed by using the third edge region 211 of the second mask 210 during the first exposure, and the pattern of the fourth metal strip 102 is formed by using the fourth edge region 212 of the second mask 210 during the last exposure.

In the embodiment of the present disclosure, in order to ensure that the metal mesh pattern formed in the second conductive film after two consecutive exposures in the splicing exposure process can be effectively connected, the width of the node of the second intermediate exposure region 213 of the second mask 210 connected with the third edge region 211 may be designed to be greater than the width of each of the light-shielding strips arranged in the grid shape in the second intermediate exposure region 213, and the width of the node of the second intermediate exposure region 213 of the second mask 210 connected with the fourth edge region 212 may be designed to be greater than the width of each of the light-shielding strips arranged in the grid shape in the second intermediate exposure region 213.

Figure 6B:
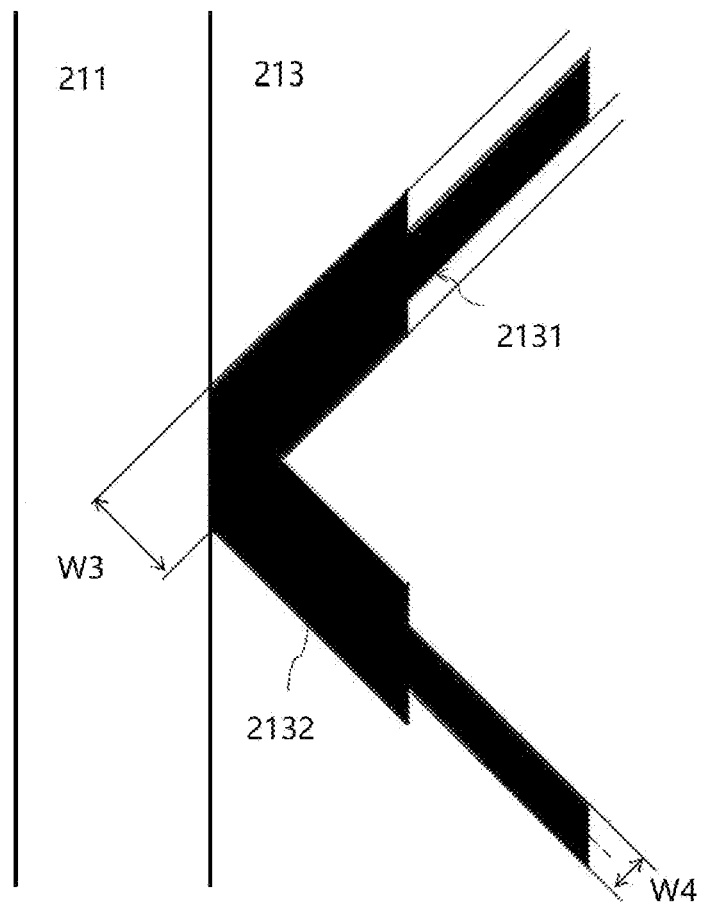
FIG. 6B is a partially enlarged view illustrating a node of a second intermediate exposure region of the second mask, which is connected with the third edge region, according to an embodiment of the present disclosure.

As shown in FIG. 6B, the width W3 of the node 2132 of the second intermediate exposure region 213 of the second mask 210 connected and in direct contact with the third edge region 211 is greater than the width W4 of each of the light-shielding strips 2131 arranged in the grid shape in the second intermediate exposure region 213. Similarly, the width of the node of the second intermediate exposure region 213 of the second mask 210 connected and in direct contact with the fourth edge region 212 is greater than the width of each of the light-shielding strips arranged in the grid shape in the second intermediate exposure region 213. In embodiments of the present disclosure, W3 is less than 100 um, and W4 is less than 8 um. The difference between W3 and W4 may be set according to actual process conditions.

In step S106, the metal stack is exposed by using a third mask to form a wire electrically connected with one of the first metal mesh pattern of the first electrode layer and the second metal mesh pattern of the second electrode layer.

In an embodiment of the present disclosure, a splicing exposure process may be performed on an edge region of the second electrode layer by using a third mask to form the wire electrically connected with one of the first metal mesh pattern of the first electrode layer and the second metal mesh pattern of the second electrode layer.

Figure 8:
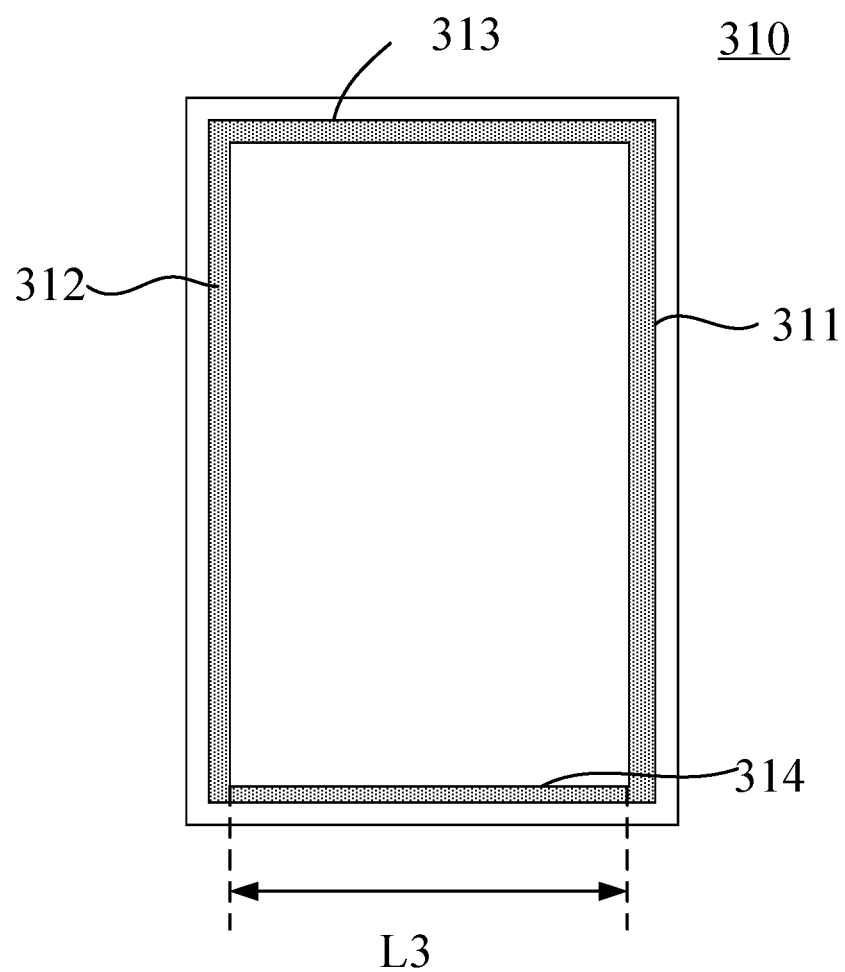
FIG. 8 is a schematic diagram illustrating a third mask according to an embodiment of the present disclosure.

FIG. 8 is a schematic diagram illustrating a third mask according to an embodiment of the present disclosure. As shown in FIG. 8, the third mask 310 includes a wire pattern region in which a pattern of the wire is formed. The wire pattern region includes a first wire pattern portion 311 and a second wire pattern portion 312 that are opposite to each other, and a third wire pattern portion 313 and a fourth wire pattern portion 314 that connect the first wire pattern portion 311 and the second wire pattern portion 312 and are opposite to each other.

In step S107, a second insulating layer is formed on a side of the second metal mesh pattern of the second electrode layer and the wire away from the base substrate. The second insulating layer is disposed in a whole layer.

In the related art, when the touch electrode is formed by the splicing exposure process, in order to improve the quality of the electrode layer in the repeated exposure region, an edge region of a mask for forming the pattern of the electrode layer is usually designed as a thickened mesh pattern, so that a thickened mesh pattern is formed in the edge regions of each of the first electrode layer and the second electrode layer opposite to each other in the splicing direction, and the thickened mesh pattern is further connected with the wire in the peripheral region. Because the thickened mesh pattern cannot implement the touch control function and belongs to the invalid area, the bezel width of touch substrate is increased.

In the method for fabricating the touch substrate according to the embodiment of the present disclosure, metal strips are formed in the edge regions of both the first electrode layer and the second electrode layer, the metal strips positioned on the two layers are formed into a metal stack, and the metal stack is directly utilized to form an electrode wire, so that a region of the thickened mesh pattern in the related art is eliminated, the bezel width can be effectively reduced, and the touch substrate with a large size and a narrow bezel is finally obtained. In addition, forming the electrode wire by using the metal stack increases the thickness of the metal wire, reduces the resistance and can effectively improve the driving difference between the far end and the near end.

In addition, in the embodiment of the present disclosure, a metal strip may also be formed only in the second electrode layer, and the wire formed by using the metal strip is electrically connected with the second metal mesh pattern in the second electrode layer. In this way, the effect of reducing the bezel width can also be achieved. In this case, a specific configuration of and a method for forming the first electrode layer may not be limited.

Figure 9:
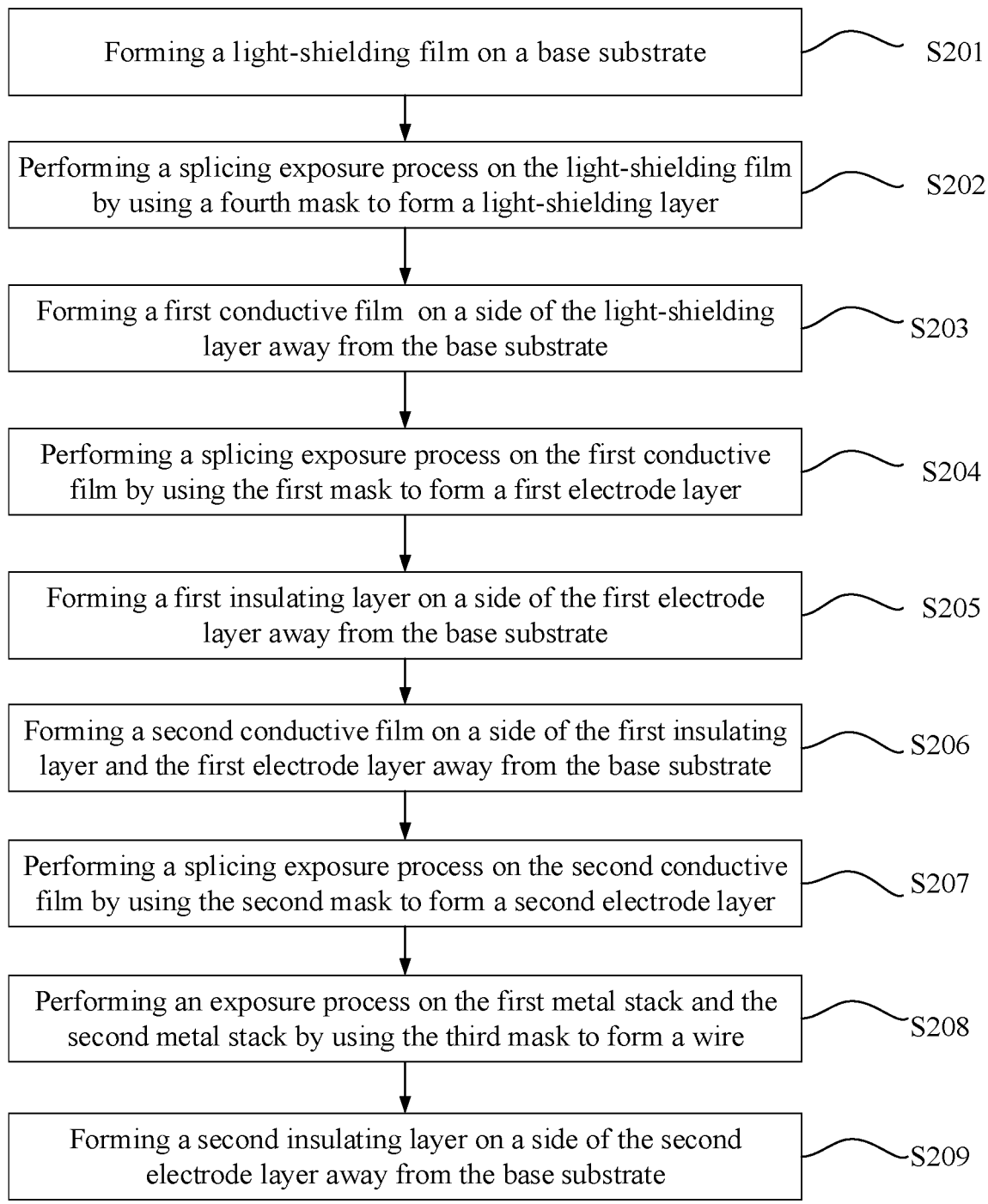
FIG. 9 is a flowchart illustrating a method of fabricating a touch substrate.

The embodiments of the present disclosure further provide a method for fabricating a touch substrate. As shown in FIG. 9, the method includes steps S201 to S209.

In step S201, a light-shielding film is formed on a base substrate.

Figure 10:
FIG. 10 is a schematic diagram illustrating forming a light-shielding material according to an embodiment of the present disclosure.

As shown in FIG. 10, a light-shielding film 001 is formed on a base substrate 10. The material of the light-shielding film may be a negative photoresist.

In step S202, a splicing exposure process is performed on the light-shielding film by using a fourth mask to form a light-shielding layer.

Figure 11:
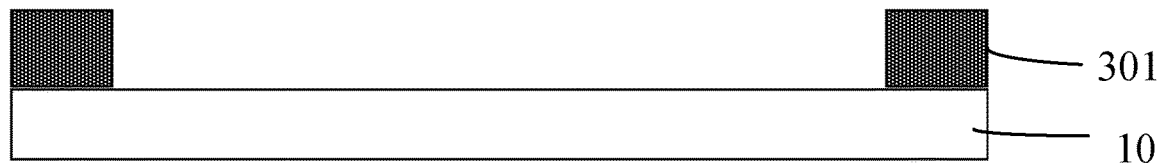
FIG. 11 is a schematic diagram illustrating forming a light-shielding layer according to an embodiment of the present disclosure.

As shown in FIG. 11, the light-shielding film 001 is subjected to splicing exposure, development, and baking to form a light-shielding layer 301.

In the present disclosure, the light-shielding layer is used to define a view area (VA area) of the touch substrate to be formed. Before the touch substrate is fabricated, the size of the view area of the touch substrate to be formed may be determined according to user requirements.

Figure 12:
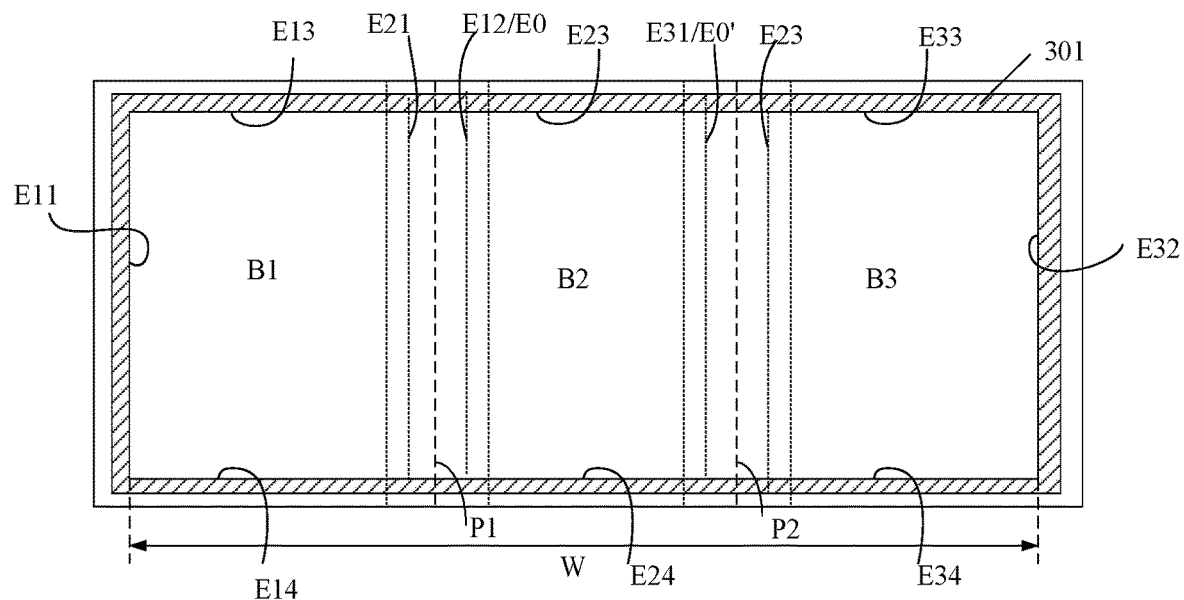
FIG. 12 is a schematic diagram illustrating a light-shielding layer according to an embodiment of the present disclosure.

FIG. 12 illustrates a schematic diagram of a light-shielding layer according to an embodiment of the present disclosure. The light-shielding layer 301 defines a VA region having a width W.

Figure 13:
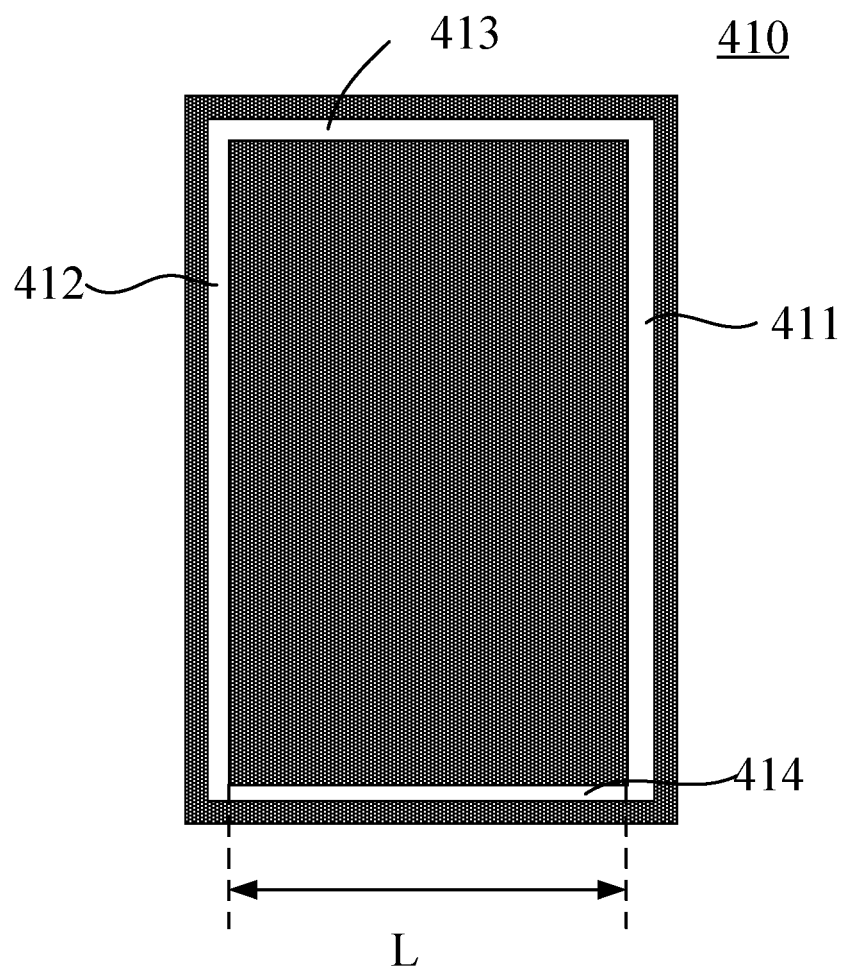
FIG. 13 is a schematic diagram illustrating a fourth mask according to an embodiment of the present disclosure.

FIG. 13 illustrates a schematic diagram of a fourth mask according to an embodiment of the present disclosure. As shown in FIG. 13, the fourth mask 410 includes a light-transmissive region and a non-light-transmissive region, and the light-transmissive region corresponds to the pattern of the light-shielding layer 301. The light-transmissive region includes first and second light-transmissive portions 411 and 412 opposite to each other, and third and fourth light-transmissive portions 413 and 414 connecting the first and second light-transmissive portions 411 and 412 and opposite to each other. A distance from an edge of the first light-transmissive portion 411 close to the second light-transmissive portion 412 to an edge of the second light-transmissive portion 412 close to the first light-transmissive portion 411 is L.

In an embodiment of the present disclosure, in order to make the number of exposures of the splicing exposure using the fourth mask the same as the number N of exposures of the splicing exposure using each of the first mask and the second mask, the distance L from the edge of the first light-transmissive portion 411 close to the second light-transmissive portion 412 to the edge of the second light-transmissive portion 412 close to the first light-transmissive portion 411 is greater than 1/N of a predetermined width W of the view area of the touch substrate, where N is an integer greater than 2.

When the splicing exposure is performed, the area of the base substrate where the view area is to be formed may be divided into a plurality of regions with the same size, and then the regions are sequentially exposed by using the fourth mask and a baffle. As shown in FIG. 12, the area of the base substrate 10 where the view area is to be formed is divided into a region B1, a region B2, and a region B3.

In exposing the region B1, the edge, which is close to the first light-transmissive portion 411, of the second light-transmissive portion 412 of the fourth mask 410 shown in FIG. 13 is aligned with the left edge E11 of the region B1, an edge, which is close to the fourth light-transmissive portion 414, of the third light-transmissive portion 413 of the fourth mask 410 is aligned with the upper edge E13 of the region B1, and an edge, which is close to the third light-transmissive portion 413, of the fourth light-transmissive portion 414 of the fourth mask 410 is aligned with the lower edge E14 of the region B1. An edge E12, which is close to the second light-transmissive portion 412, of the first light-transmissive portion 411 of the fourth mask 410 is located at a dotted line E0. Since the distance L from the edge of the first light-transmissive portion 411 close to the second light-transmissive portion 412 to the edge of the second light-transmissive portion 412 close to the first light-transmissive portion 411 is greater than ⅓ of the predetermined width W of the view area of the touch substrate, the edge, which is close to the second light-transmissive portion 412, of the first light-transmissive portion 411 of the fourth mask 410 is located at the right side of the boundary P1 between the region B1 and the region B2. When the region B1 is exposed by using the fourth mask, the first light-transmissive portion 411 is first shielded by the baffle, and then exposed, so that a shielding material is prevented from being left in the view area.

In exposing the region B3, the edge, which is close to the second light-transmissive portion 412, of the first light-transmissive portion 411 of the fourth mask 410 is aligned with the right edge E32 of the region B3, the edge, which is close to the fourth light-transmissive portion 414, of the third light-transmissive portion 413 of the fourth mask 410 is aligned with the upper edge E33 of the region B3, and the edge, which is close to the third light-transmissive portion 413, of the fourth light-transmissive portion 414 of the fourth mask 410 is aligned with the lower edge E34 of the region B3. An edge E31, which is close to the first light-transmissive portion 411, of the second light-transmissive portion 412 of the fourth mask 410 is located at a dotted line E0'. Since the distance L from the edge of the first light-transmissive portion 411 of the fourth mask 410 close to the second light-transmissive portion 412 to the edge of the second light-transmissive portion 412 close to the first light-transmissive portion 411 is greater than ⅓ of the predetermined width W of the view area of the touch substrate, the edge of the second light-transmissive portion 412 of the fourth mask 410 close to the first light-transmissive portion 411 is located at the left side of the boundary P2 between the region B3 and the region B2. When the region B3 is exposed by using the fourth mask, the second light-transmissive portion 412 is first shielded by the baffle, so as to avoid leaving a shielding material in the view area.

In exposing the region B2, the edge of the third light-transmissive portion 413 of the fourth mask 410 close to the fourth light-transmissive portion 414 is aligned with the upper edge E23 of the region B2, the edge of the fourth light-transmissive portion 414 of the fourth mask 410 close to the third light-transmissive portion 413 is aligned with the lower edge E24 of the region B2, the edge of the second light-transmissive portion 412 of the fourth mask 410 close to the first light-transmissive portion 411 is located at the left side of the dotted line E0, and the edge of the first light-transmissive portion 411 of the fourth mask 410 close to the second light-transmissive portion 412 is located at the right side of the dotted line E0', so that the area where the first light-transmissive portion of the fourth mask is positioned when exposing the region B1 and the area where the second light-transmissive portion of the fourth mask is positioned when exposing the region B2 are staggered from each other without overlapping, and the area where the first light-transmissive portion of the fourth mask is positioned when exposing the region B2 and the area where the second light-transmissive portion of the fourth mask is positioned when exposing the region B3 are staggered from each other without overlapping. In the embodiment of the present disclosure, when exposing the region B2, the edge of the second light-transmissive portion 412 of the fourth mask 410 close to the first light-transmissive portion 411 is offset to the left relative to the dotted line E0 by a distance greater than 0 and smaller than (3L−W). In this way, when exposing the region B2 after exposing the region B1, it is ensured that the area where the first light-transmissive portion of the fourth mask is located when exposing the region B1 and the area where the second light-transmissive portion of the fourth mask is located when exposing the region B2 are staggered from each other without overlapping, and the area where the first light-transmissive portion of the fourth mask is located when exposing the region B2 and the area where the second light-transmissive portion of the fourth mask is located when exposing the region B3 are staggered from each other without overlapping. When the region B2 is exposed by using the fourth mask, the first light-transmissive portion 411 and the second light-transmissive portion 412 are shielded by the baffle, so that the shielding material is prevented from being left in the view area.

After performing splicing exposure on the shielding film, the exposed shielding film is developed and baked to form the light-shielding layer.

In step S203, a first conductive film is formed on a side of the light-shielding layer away from the base substrate.

Figure 14:
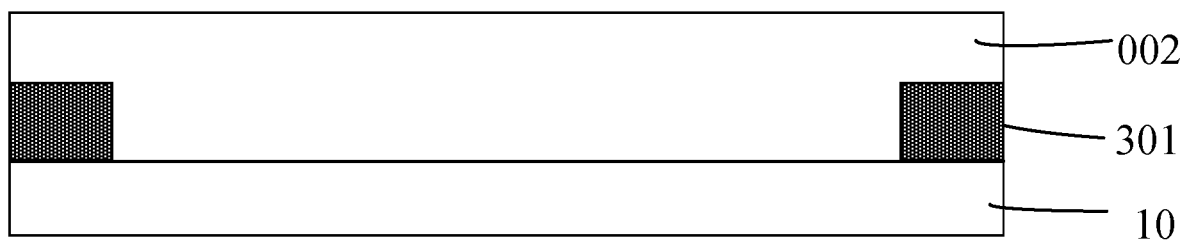
FIG. 14 is a schematic diagram illustrating forming a first conductive film according to an embodiment of the present disclosure.

As shown in FIG. 14, a first conductive film 002 is formed on the side of the light-shielding layer 301 away from the base substrate 10. The first conductive film may be formed by a sputtering deposition method or a coating method. In some embodiments, the material for forming the first conductive film may be aluminum, copper, or an alloy thereof.

In step S204, a splicing exposure process is performed on the first conductive film by using the first mask to form a first electrode layer, and the first electrode layer includes a first metal strip and a second metal strip which are positioned at two opposite side edges of the base substrate and a first metal mesh pattern between the first metal strip and the second metal strip. The first mask includes a first edge region, a second edge region and a first intermediate exposure region positioned between the first edge region and the second edge region. The first edge region and the second edge region are strip-shaped light-shielding regions, and the first intermediate exposure region includes light-shielding strips arranged in a grid shape. The shape of the first edge region of the first mask is the same as that of the first metal strip of the first electrode layer, and the shape of the second edge region of the first mask is the same as that of the second metal strip of the first electrode layer.

Figure 15:
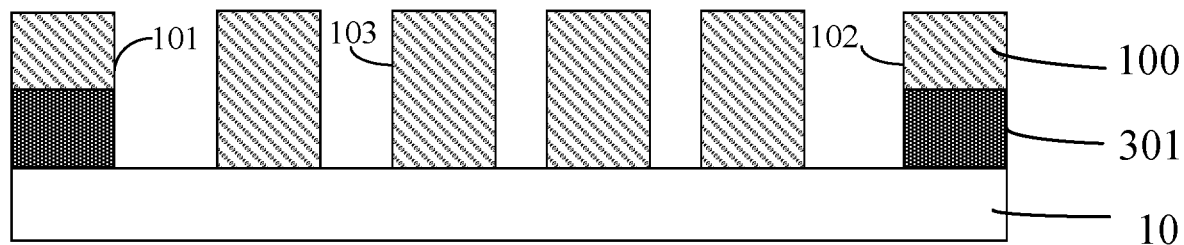
FIG. 15 is a schematic diagram illustrating forming a first electrode layer according to an embodiment of the present disclosure.

As shown in FIG. 15, the first conductive film 002 is subjected to a splicing exposure process based on a positive photoresist to form a first electrode layer 100.

In some embodiments, step S204 may include coating a positive photoresist on a side of the first conductive film away from the base substrate; and performing splicing exposure, development, etching and stripping on the coated positive photoresist by adopting the first mask to obtain the first electrode layer.

When the splicing exposure is performed, the touch electrode area of the base substrate may be divided into a plurality of regions, and then the regions are sequentially exposed by adopting the first mask. For example, in the case of performing the splicing exposure including three exposures, the base substrate is divided into three regions of the same size in the first direction (for example, the longitudinal direction), and the three regions of the same size of the base substrate are sequentially exposed using the first mask.

The pattern of the first metal strip 101 is formed by using the first edge region of the first mask during the first exposure, and the pattern of the second metal strip 102 is formed by using the second edge region of the first mask during the last exposure.

In step S205, a first insulating layer is formed on a side of the first electrode layer away from the base substrate, an orthographic projection of the first insulating layer on the base substrate is at least partially overlapped with an orthographic projection of the first metal mesh pattern of the first electrode layer on the base substrate, and is not overlapped with orthographic projections of the first metal strip and the second metal strip of the first electrode layer on the base substrate.

Figure 16:
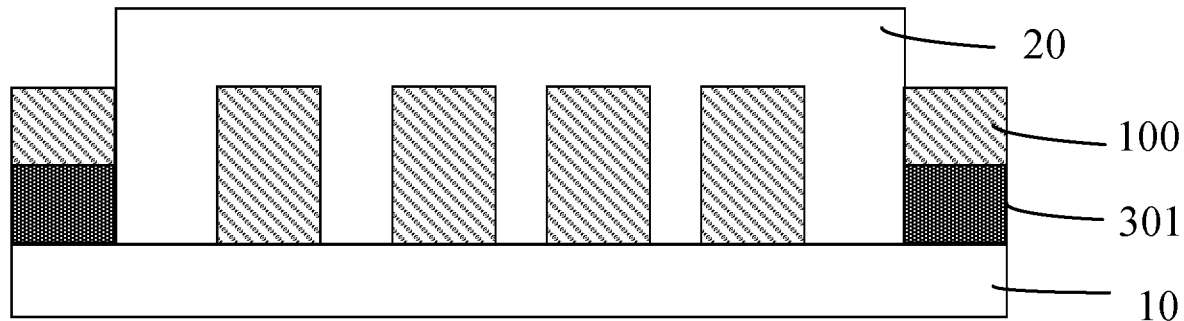
FIG. 16 is a schematic diagram illustrating forming a first insulating layer according to an embodiment of the present disclosure.

As shown in FIG. 16, the first insulating layer 20 is formed on a side of the first electrode layer 301 away from the base substrate 10, and the first insulating layer 20 is formed only in the area where the first metal mesh pattern 103 of the first electrode layer 100 is located, and is not formed in the area where the first metal strip 101 and the second metal strip 102 of the first electrode layer 100 are located.

In step S206, a second conductive film is formed on a side of the first insulating layer and the first electrode layer away from the base substrate.

Figure 17:
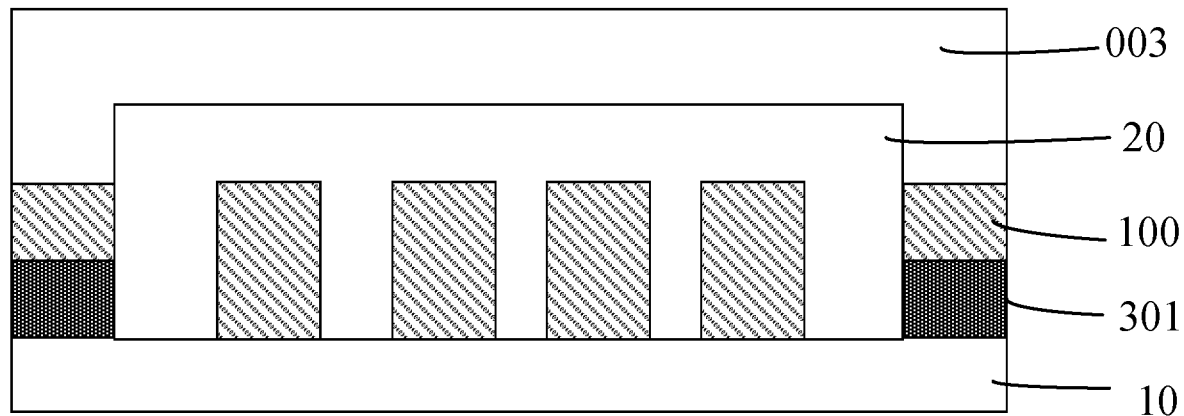
FIG. 17 is a schematic diagram illustrating forming a second conductive film according to an embodiment of the present disclosure.

As shown in FIG. 17, the second conductive film 003 is formed on the side of the first insulating layer 20 and the first electrode layer 100 away from the base substrate 10. The second conductive film may be formed by a sputtering deposition method or a coating method. In some embodiments, the material for forming the second conductive film may be aluminum, copper, or an alloy thereof.

In step S207, a splicing exposure process is performed on the second conductive film by using the second mask to form a second electrode layer, the second electrode layer includes a third metal strip and a fourth metal strip located at two opposite side edges of the base substrate, and a second metal mesh pattern between the third metal strip and the fourth metal strip. The third metal strip is in direct contact with the first metal strip to form a first metal stack, and the fourth metal strip is in direct contact with the second metal strip to form a second metal stack. The orthographic projection of the third metal strip on the base substrate is at least partially overlapped with the orthographic projection of the first metal strip on the base substrate, and the orthographic projection of the fourth metal strip on the base substrate is at least partially overlapped with the orthographic projection of the second metal strip on the base substrate. In some embodiments, the orthographic projection of the third metal strip on the base substrate is completely overlapped with the orthographic projection of the first metal strip on the base substrate, and the orthographic projection of the fourth metal strip on the base substrate is completely overlapped with the orthographic projection of the second metal strip on the base substrate.

Figure 18:
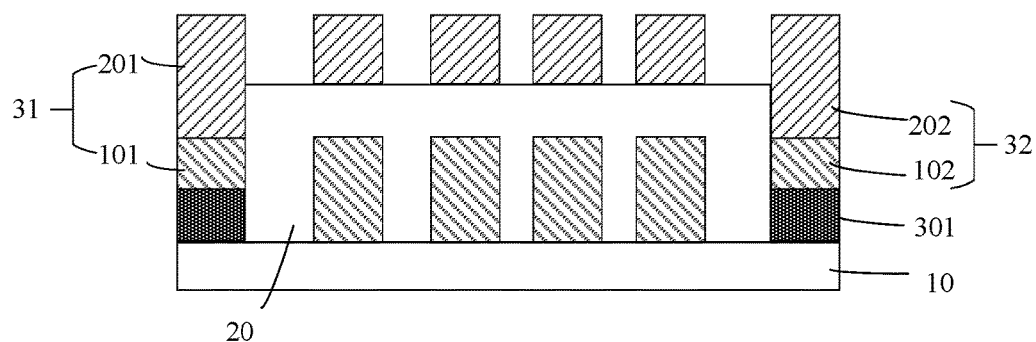
FIG. 18 is a schematic diagram illustrating forming a second electrode layer according to an embodiment of the present disclosure.

As shown in FIG. 18, the second conductive film 003 is subjected to a splicing exposure process based on the positive photoresist to form the second electrode layer 200. Since the first insulating layer 20 is formed only at the region corresponding to the first metal mesh pattern 103 of the first electrode layer 100, and is not formed at the region corresponding to the first metal strip 101 and the second metal strip 102 of the first electrode layer 100, the first metal strip 101 and the third metal strip 201 are at least partially in contact to form the first metal stack 31, and the second metal strip 102 and the fourth metal strip 202 are at least partially in contact to form the second metal stack 32. The first metal stack and the second metal stack are respectively located in two edge regions of the touch substrate to be formed.

The second mask includes a third edge region, a fourth edge region and a second intermediate exposure region positioned between the third edge region and the fourth edge region. The third edge region and the fourth edge region are strip-shaped light-shielding regions, and the second intermediate exposure region includes light-shielding strips arranged in a grid shape. The shape of the third edge region of the second mask is the same as that of the third metal strip of the second electrode layer, and the shape of the fourth edge region of the second mask is the same as that of the fourth metal strip of the second electrode layer.

When the splicing exposure is performed, the touch electrode area of the base substrate may be divided into a plurality of regions, and then the regions are sequentially exposed by adopting the second mask. For example, in the case of performing the splicing exposure including three exposures, the base substrate is divided into three regions of the same size in the first direction (for example, the longitudinal direction), and the three regions of the same size of the base substrate are sequentially exposed using the second mask.

The pattern of the third metal strip 201 is formed by using the third edge region 211 of the second mask 210 during the first exposure, and the pattern of the fourth metal strip 102 is formed by using the fourth edge region 212 of the second mask 210 during the last exposure.

In some embodiments, step S207 may include coating a positive photoresist on a side of the second conductive film away from the base substrate; and performing splicing exposure, development, etching and stripping on the coated positive photoresist by adopting the first mask to obtain the second electrode layer.

In step S208, an exposure process is performed on the first metal stack and the second metal stack by using the third mask to form a wire for the second electrode layer.

In an embodiment of the present disclosure, a portion of the second electrode layer located in the peripheral region may be subjected to a splicing exposure process by using the third mask to form the wire electrically connected with one of the first metal mesh pattern of the first electrode layer and the second metal mesh pattern of the second electrode layer.

In an embodiment of the present disclosure, the wire is formed to be electrically connected with the first metal mesh pattern of the first electrode layer, and a length of each of nodes of the first intermediate exposure region of the first mask connected with the first edge region and the second edge region is greater than a length of each of nodes of the second intermediate exposure region of the second mask connected with the third edge region and the fourth edge region in a direction away from the first edge region of the first mask and/or in a direction away from the third edge region of the second mask. Thus, it is ensured that the first metal mesh pattern of the first electrode layer can be connected with the wire more effectively.

In an embodiment of the present disclosure, the wire is formed to be electrically connected with the second metal mesh pattern of the second electrode layer, and a length of each of nodes of the second intermediate exposure region of the second mask connected with the third edge region and the fourth edge region is greater than a length of each of nodes of the first intermediate exposure region of the first mask connected with the first edge region and the second edge region, in a direction away from the first edge region of the first mask and/or in a direction away from the third edge region of the second mask. Thus, it is ensured that the second metal mesh pattern of the second electrode layer can be connected with the wire more effectively.

As shown in FIG. 8, the third mask includes a wire pattern region, the wire pattern region includes a first wire pattern portion 311 and a second wire pattern portion 312 opposite to each other, and a third wire pattern portion 313 and a fourth wire pattern portion 314 connecting the first wire pattern portion 311 and the second wire pattern portion 312 and disposed opposite to each other. The distance from the edge of the first wire pattern portion 311 close to the second wire pattern portion 312 to the edge of the second wire pattern portion 312 close to the first wire pattern portion 311 is L3.

In an embodiment of the present disclosure, in order to make the number of exposures of the splicing exposure using the third mask the same as the number of exposures of the splicing exposure using each of the first mask and the second mask, the distance L3 from the edge of the first wire pattern portion 311 close to the second wire pattern portion 312 to the edge of the second wire pattern portion 312 close to the first wire pattern portion 311 is greater than a width L1 of the first intermediate exposure region 113 of the first mask 110 and a width L2 of the second intermediate exposure region 213 of the second mask 210.

Figure 19:
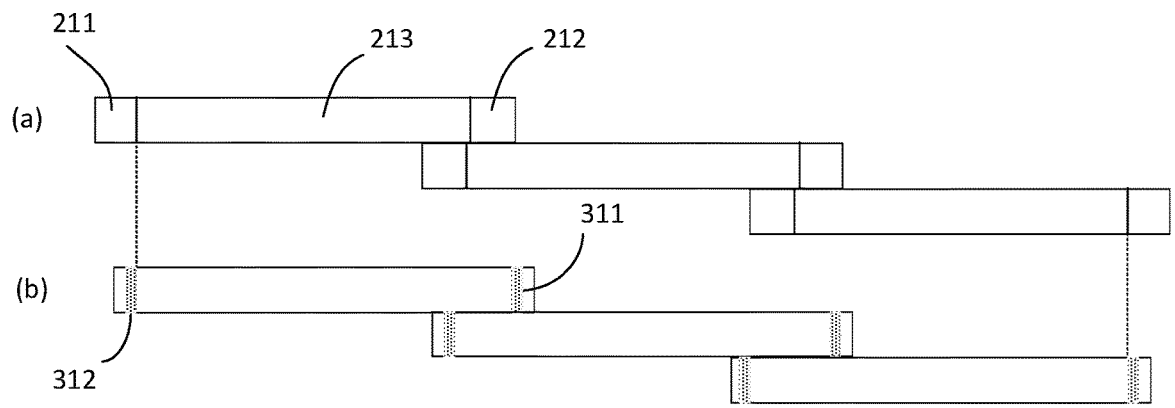
FIG. 19 is a schematic diagram illustrating relative positions of the second mask in a splicing exposure including three exposures and relative positions of the third mask in the splicing exposure including three exposures, according to an embodiment of the present disclosure.

Part (a) of FIG. 19 illustrates relative positions of the second mask 210 in three exposures of a splicing exposure, and part (b) of FIG. 19 illustrates relative positions of the third mask 310 in the three exposures of the splicing exposure. As shown in FIG. 19, the edge of the second wire pattern portion 312 close to the first wire pattern portion 311 in the first exposure using the third mask 310 is aligned with the edge of the third edge region 211 of the second mask 210 close to the second intermediate exposure region 213 in the first exposure using the second mask 210; the edge of the first wire pattern portion 311 close to the second wire pattern portion 312 in the third (i.e., last) exposure using the third mask 310 is aligned with the edge of the fourth edge region 212 of the second mask 210 close to the second intermediate exposure region 213 in the third (i.e., last) exposure using the second mask 210. The edge of the second wire pattern portion 312 close to the first wire pattern portion 311 during the second exposure using the third mask 310 is offset to the left relative to the edge of the first wire pattern portion 311 close to the second wire pattern portion 312 during the first exposure using the third mask 310, and the edge of the first wire pattern portion 311 close to the second wire pattern portion 312 during the second exposure using the third mask 310 is offset to the right relative to the edge of the second wire pattern portion 312 close to the first wire pattern portion 311 during the third exposure using the third mask 310. Therefore, the wire pattern connected with the metal mesh structure of the second electrode layer can be formed at the left edge region and the right edge region of the touch substrate. Meanwhile, during each exposure, the first wire pattern portion 311 and the second wire pattern portion 312 can be spaced apart from the repeated exposure region when exposing the second conductive film by using the second mask 210, so that damage to the metal mesh structure in the repeated exposure region is avoided.

In step S209, a second insulating layer is formed on a side of the second electrode layer away from the base substrate.

Figure 20:
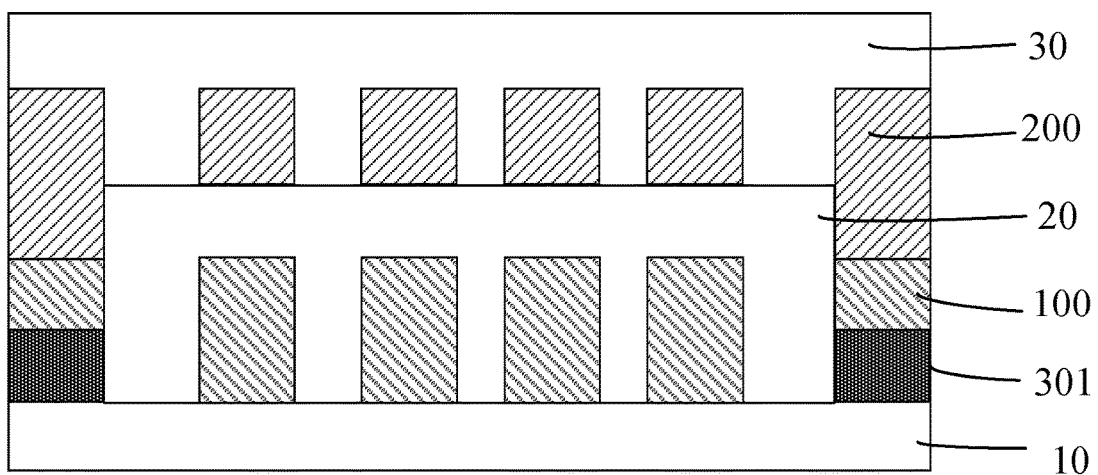
FIG. 20 is a schematic diagram illustrating forming a second electrode layer according to an embodiment of the present disclosure.

As shown in FIG. 20, a second insulating layer 30 is formed on a side of the second electrode layer 200 away from the base substrate 10.

In the method for fabricating the touch substrate according to the embodiment of the present disclosure, the metal strips are formed in the edge regions, opposite to each other in the splicing direction, of each of the first electrode layer and the second electrode layer, the metal strips on the two sides form the metal stacks, respectively, and the metal stacks are directly utilized to form the electrode wires, so that the region of the thickened mesh pattern in the related art is eliminated, the bezel width can be effectively reduced, and the touch substrate with a large size and a narrow bezel is finally obtained. In addition, the electrode wire is fabricated by utilizing the metal stack, which can increase the thickness of the metal wire, reduce the resistance and can effectively improve the driving difference of the far end and the near end.

By increasing the distance between the light-transmissive regions of the mask for forming the shielding layer, which are opposite in the splicing direction, the splicing exposure of the shielding layer can be realized by using fewer number of exposures while ensuing that the shielding material is not left in the view area.

By increasing the distance between the wire pattern portions of the mask for forming the wire pattern, which are opposite in the splicing direction, the splicing exposure of the wire metal can be realized by using fewer number of exposures, and at the same time, the secondary damage to the repeated exposure region of the first electrode layer and the second electrode layer can be avoided.

Embodiments of the present disclosure further provide a touch substrate, as shown in FIG. 20, including: a base substrate 10; a shielding layer 301 on the base substrate 10 and in a peripheral area of the touch substrate; a first electrode layer 100 on a side of the shielding layer 301 away from the base substrate 10, the first electrode layer 100 including a first metal strip 101, a second metal strip 102 and a first metal mesh pattern 103 positioned between the first metal strip 101 and the second metal strip 102; a first insulating layer 20 on a side of the first electrode layer 100 away from the base substrate 10, an orthographic projection of the first insulating layer 20 on the base substrate 10 being at least partially overlapped with an orthographic projection of the first metal mesh pattern 103 of the first electrode layer 100 on the base substrate 10, and not overlapped with orthographic projections of the first metal strip 101 and the second metal strip 102 of the first electrode layer 100 on the base substrate 10; a second electrode layer 200 on a side of the first insulating layer 20 away from the first electrode layer 100, the second electrode layer 200 including third and fourth metal strips 201 and 202 and a second metal mesh pattern 203 between the third and fourth metal strips 201 and 202, an orthographic projection of the third metal strip 201 on the base substrate 20 being at least partially overlapped with an orthographic projection of the first metal strip 101 on the base substrate 10, an orthographic projection of the fourth metal strip 202 on the base substrate 10 being at least partially overlapped with an orthographic projection of the second metal strip 102 on the base substrate 10, the first and third metal strips 101 and 201 being at least partially in direct contact to form a first metal stack, and the second and fourth metal strips 102 and 202 being at least partially in direct contact to form a second metal stack; and a second insulating layer 30 on a side of the second electrode layer 200 away from the base substrate 10. The first metal stack and the second metal stack include a wire electrically connected with one of the first metal mesh pattern 103 of the first electrode layer 100 and the second metal mesh pattern 203 of the second electrode layer 200.

In an embodiment of the present disclosure, a width of each of nodes of the first metal mesh pattern of the first electrode layer, which are connected with the first metal strip and the second metal strip of the first electrode layer, is greater than a width of each of metal lines arranged in a grid shape in the first metal mesh pattern, and a width of each of nodes of the second metal mesh pattern of the second electrode layer, which are connected with the third metal strip and the fourth metal strip of the second electrode layer, is greater than a width of each of metal lines arranged in a grid shape in the second metal mesh pattern.

In an embodiment of the present disclosure, the wire is electrically connected with the first metal mesh pattern of the first electrode layer; along the direction away from the metal strip of the first electrode layer and/or along the direction away from the metal strip of the second electrode layer, a length of each of nodes of the first metal mesh pattern of the first electrode layer, which are connected with the first metal strip and the second metal strip of the first electrode layer, is greater than a length of each of nodes of the second metal mesh pattern of the second electrode layer, which are connected with the third metal strip and the fourth metal strip of the second electrode layer.

In an embodiment of the present disclosure, the first metal mesh pattern includes a plurality of first touch electrode channels, an extending direction of the first touch electrode channel intersects an extending direction of the first metal strip, the wire is electrically connected with the first touch electrode channels, and a first dummy electrode may be disposed on one side or both sides of the plurality of first touch electrode channels.

In an embodiment of the present disclosure, the second metal mesh pattern includes a plurality of second touch electrode channels, an extending direction of the second touch electrode channel is substantially the same as an extending direction of the third metal strip, a second dummy electrode may be disposed on one side or two sides of the plurality of second touch electrode channels, the wire is electrically connected with at least a part of the second dummy electrode, and since no signal is applied to the at least part of the second dummy electrode, a signal of the first touch electrode channel is not affected.

Since the plurality of first touch electrode channels included in the first metal mesh pattern are formed by multiple exposures, the length of the thickened node of the first metal mesh pattern connected with the first metal strip of the first electrode layer is set to be larger in order to avoid channel disconnection.

In the embodiment of the present disclosure, for any two consecutive exposures, the position of the edge of the third edge region of the second mask close to the fourth edge region in the latter exposure is offset relative to the position of the edge of the fourth edge region of the second mask close to the third edge region in the former exposure, so that the area of the second intermediate exposure region of the second mask in the latter exposure is partially overlapped with the area of the second intermediate exposure region of the second mask in the former exposure, and the overlapped portion is located in the dummy electrode region, so as to keep away from the touch electrode channel as much as possible, thereby avoiding the influence on the signal transmission in the channel.

In the embodiment of the present disclosure, for any two consecutive exposures, the regions where the metal mesh patterns of the exposure regions are located are partially overlapped. Within the overlapped portions of the regions, thickened metal lines may be formed on the touch substrate due to the existence of thickened nodes and/or the existence of process errors, and the width of the thickened metal line is larger than that of the metal line in the non-overlapped region; in some embodiments, the thickened metal lines are located in a dummy electrode region, for example, a dummy electrode region in the second metal mesh pattern.

In an embodiment of the present disclosure, the wire is electrically connected with the second metal mesh pattern of the second electrode layer; along the direction away from the metal strip of the first electrode layer and/or along the direction away from the metal strip of the second electrode layer, the length of each of the nodes of the first metal mesh pattern of the first electrode layer connected with the first metal strip and the second metal strip of the first electrode layer is greater than the length of each of the nodes of the second metal mesh pattern of the second electrode layer connected with the third metal strip and the fourth metal strip of the second electrode layer.

In an embodiment of the present disclosure, the second metal mesh pattern includes a plurality of second touch electrode channels, an extending direction of the second touch electrode channel intersects an extending direction of the third metal strip, the wire is electrically connected with the second touch electrode channels, and a second dummy electrode may be disposed on one side or both sides of the plurality of second touch electrode channels.

In an embodiment of the present disclosure, the first metal mesh pattern includes a plurality of first touch electrode channels, an extending direction of the first touch electrode channel is substantially the same as an extending direction of the first metal strip, a first dummy electrode may be disposed on one side or two sides of the plurality of first touch electrode channels, the wire is electrically connected with at least a part of the first dummy electrode, and since no signal is applied to the at least part of the first dummy electrode, a signal of the second touch electrode channel is not affected.

Since the plurality of second touch electrode channels included in the second metal mesh pattern are formed by multiple exposures, the length of the thickened node of the second metal mesh pattern connected with the third metal strip of the second electrode layer is set to be larger in order to avoid channel disconnection.

In the embodiment of the present disclosure, for any two consecutive exposures, the position of the edge of the first edge region of the first mask close to the second edge region in the latter exposure is offset relative to the position of the edge of the second edge region of the first mask close to the first edge region in the former exposure, so that the region of the first intermediate exposure region of the first mask in the latter exposure is partially overlapped with the region of the first intermediate exposure region of the first mask in the former exposure, and the overlapped portion is located in the dummy electrode region, so as to keep away from the touch electrode channel as much as possible, thereby avoiding the influence on the signal transmission in the channel.

In the embodiment of the present disclosure, for any two consecutive exposures, the regions where the metal mesh patterns of the exposure regions are located are partially overlapped. Within the overlapped portions of the regions thickened metal lines may be formed on the touch substrate due to the existence of thickened nodes and/or the existence of process errors, and the width of the thickened metal line is larger than that of the metal line in the non-overlapped region; in some embodiments, the thickened metal lines are located in a dummy electrode region, for example, a dummy electrode region in the first metal mesh pattern.

The embodiments of the present disclosure further provide a touch device, which includes the touch substrate according to the embodiment of the present disclosure.

The embodiments of the present disclosure further provide a substrate for forming a touch substrate, including: a first electrode layer including a metal strip located in an edge region of the first electrode layer and a first metal mesh pattern connected with the metal strip, and a second electrode layer located on one side of the first electrode layer and including a metal strip located in an edge region of the second electrode layer and a second metal mesh pattern connected with the metal strip, the second metal mesh pattern is insulated from the first metal mesh pattern, and the metal strip of the first electrode layer is in direct contact with the metal strip of the second electrode layer to form a metal stack. The metal stack is used for forming a wire electrically connected with one of the first metal mesh pattern of the first electrode layer and the second metal mesh pattern of the second electrode layer.

In an embodiment of the present disclosure, the metal strip of the first electrode layer includes first and second metal strips opposite to each other, and the first metal mesh pattern connects the first and second metal strips; the metal strip of the second electrode layer includes a third metal strip and a fourth metal strip which are opposite to each other, and the second metal mesh pattern connects the third metal strip and the fourth metal strip. The third metal strip is in direct contact with the first metal strip to form a first metal stack, and the fourth metal strip is in direct contact with the second metal strip to form a second metal stack. The first metal stack and the second metal stack are used for forming a wire which is electrically connected with one of the first metal mesh pattern of the first electrode layer and the second metal mesh pattern of the second electrode layer.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the present disclosure, and these changes and modifications are to be considered within the protection scope of the present disclosure.

What is claimed is:

1. A method for fabricating a touch substrate, comprising:
    forming a first electrode layer through a splicing exposure process, wherein the first electrode layer comprises a metal strip in an edge region of the first electrode layer and a first metal mesh pattern connected with the metal strip;
    forming a second electrode layer on one side of the first electrode layer through a splicing exposure process, wherein the second electrode layer comprises a metal strip in an edge region of the second electrode layer and a second metal mesh pattern connected with the metal strip, the second metal mesh pattern is insulated from the first metal mesh pattern, and the metal strip of the first electrode layer is in direct contact with the metal strip of the second electrode layer to form a metal stack; and
    forming a wire electrically connected with one of the first metal mesh pattern of the first electrode layer and the second metal mesh pattern of the second electrode layer by using the metal stack.

2. The method of claim 1, wherein forming the first electrode layer through the splicing exposure process comprises:
    forming a first conductive film; and
    performing the splicing exposure process on the first conductive film by using a first mask to form the first electrode layer, wherein the first mask comprises a first edge region and a first exposure region connected with the first edge region, the first edge region is a strip-shaped light-shielding region, and the first exposure region comprises light-shielding strips arranged in a grid shape.

3. The method of claim 2, wherein forming the second electrode layer on one side of the first electrode layer through the splicing exposure process comprises:
    forming a second conductive film on the one side of the first electrode layer; and
    performing the splicing exposure process on the second conductive film by using a second mask to form the second electrode layer, wherein the second mask comprises a third edge region and a second exposure region connected with the third edge region, the third edge region is a light-shielding region, and the second exposure region comprises light-shielding strips arranged in a grid shape.

4. The method of claim 3, wherein the first mask further comprises a second edge region, the first exposure region connects the first edge region and the second edge region, the second edge region is a light-shielding region, the second mask further comprises a fourth edge region, the second exposure region connects the third edge region and the fourth edge region, and the fourth edge region is a light-shielding region,
- the metal strip of the first electrode layer comprises first and second metal strips opposite to each other, and the first metal mesh pattern connects the first and second metal strips,
- the metal strip of the second electrode layer comprises third and fourth metal strips opposite to each other, and the second metal mesh pattern connects the third and fourth metal strips,
- the third metal strip is in direct contact with the first metal strip to form a first metal stack, and the fourth metal strip is in direct contact with the second metal strip to form a second metal stack, and
- forming the wire electrically connected with one of the first metal mesh pattern of the first electrode layer and the second metal mesh pattern of the second electrode layer by using the metal stack comprises: forming the wire electrically connected with one of the first metal mesh pattern of the first electrode layer and the second metal mesh pattern of the second electrode layer by using the first metal stack and the second metal stack.

5. The method of claim 4, wherein performing the splicing exposure process on the first conductive film by using the first mask comprises:
- forming a pattern of the first metal strip by using the first edge region of the first mask during a first exposure; and
- forming a pattern of the second metal strip by using the second edge region of the first mask during a last exposure.

6. The method of claim 5, wherein performing the splicing exposure process on the first conductive film by using the first mask further comprises:
- for any two consecutive exposures, making a position of an edge, which is close to the second edge region, of the first edge region of the first mask in a latter one of the two exposures to be offset relative to a position of an edge, which is close to the first edge region, of the second edge region of the first mask in a former one of the two exposures, so that an area where the first exposure region of the first mask is located in the latter exposure is partially overlapped with an area where the first exposure region of the first mask is located in the former exposure.

7. The method of claim 4, wherein performing the splicing exposure process on the second conductive film by using the second mask comprises:
- forming a pattern of the third metal strip by using the third edge region of the second mask during a first exposure, and
- forming a pattern of the fourth metal strip by using the fourth edge region of the second mask during a last exposure.

8. The method of claim 7, wherein performing the splicing exposure process on the second conductive film by using the second mask further comprises:
- for any two consecutive exposures, making a position of an edge, which is close to the fourth edge region, of the third edge region of the second mask in a latter one of the two exposures to be offset relative to a position of an edge, which is close to the third edge region, of the fourth edge region of the second mask in a former one of the two exposures, so that an area where the second exposure region of the second mask is located in the latter exposure is partially overlapped with an area where the second exposure region of the second mask is located in the former exposure.

9. The method of claim 2, wherein a width of a node of the first exposure region of the first mask, which is connected with the first edge region, is greater than a width of each of the light-shielding strips arranged in the grid shape in the first exposure region.

10. The method of claim 3, wherein a width of a node of the second exposure region of the second mask, which is connected with the third edge region, is greater than a width of each of the light-shielding strips arranged in the grid shape in the second exposure region.

11. The method of claim 10, wherein the wire is formed to be electrically connected with the first metal mesh pattern of the first electrode layer, and
- along a direction away from the first edge region of the first mask and/or along a direction away from the third edge region of the second mask, a length of a node of the first exposure region of the first mask, which is connected with the first edge region, is greater than a length of the node of the second exposure region of the second mask, which is connected with the third edge region.

12. The method of claim 4, further comprising:
- forming a light-shielding film on a base substrate;
- performing a splicing exposure process on the light-shielding film by using a fourth mask to form a light-shielding layer,
- wherein the fourth mask comprises a light-transmissive region and a non-light-transmissive region, the light-transmissive region comprises a first light-transmissive portion and a second light-transmissive portion opposite to each other, and a third light-transmissive portion and a fourth light-transmissive portion which are opposite to each other and connect the first light-transmissive portion and the second light-transmissive portion, and
- a distance from an edge of the first light-transmissive portion close to the second light-transmissive portion to an edge of the second light-transmissive portion close to the first light-transmissive portion is larger than 1/N of a preset width of a view area of the touch substrate, where N is the number of exposures of the splicing exposure process using the fourth mask.

13. The method of claim 12, wherein the view area comprises a first region, a second region and a third region which are connected,
- the splicing exposure process performed on the light-shielding film by using the fourth mask comprises a first exposure for the first region, a second exposure for the second region and a third exposure for the third region,
- during the first exposure, an edge of the second light-transmissive portion of the fourth mask close to the first light-transmissive portion is aligned with a left edge of the first region, an edge of the third light-transmissive portion of the fourth mask close to the fourth light-transmissive portion is aligned with an upper edge of the first region, and an edge of the fourth light-transmissive portion of the fourth mask close to the third light-transmissive portion is aligned with a lower edge of the first region, during the second exposure, the edge of the third light-transmissive portion of the fourth mask close to the fourth light-transmissive portion is aligned with an upper edge of the second region, the edge of the fourth light-transmissive portion of the fourth mask close to the third light-transmissive portion is aligned with a lower edge of the second region, and the edge of the second light-transmissive portion of the fourth mask close to the first light-transmissive portion is offset to the left relative to an edge of the first light-transmissive portion of the fourth mask close to the second light-transmissive portion during the first exposure by a distance greater than 0 and smaller than (3L−W), where W is the preset width of the view area of the touch substrate, and L is a distance from the edge of the first light-transmissive portion of the fourth mask close to the second light-transmissive portion to the edge of the second light-transmissive portion close to the first light-transmissive portion, and during the third exposure, the edge of the first light-transmissive portion of the fourth mask close to the second light-transmissive portion is aligned with a right edge of the third region, the edge of the third light-transmissive portion of the fourth mask close to the fourth light-transmissive portion is aligned with an upper edge of the third region, and the edge of the fourth light-transmissive portion of the fourth mask close to the third light-transmissive portion is aligned with a lower edge of the third region.

14. The method of claim 4, wherein the first electrode layer and the second electrode layer are formed on a base substrate, and the method further comprises:
forming a first insulating layer on a side of the first electrode layer away from the base substrate, wherein an orthographic projection of the first insulating layer on the base substrate is at least partially overlapped with an orthographic projection of the first metal mesh pattern of the first electrode layer on the base substrate, and is not overlapped with an orthographic projection of the first metal strip and the second metal strip of the first electrode layer on the base substrate, wherein the second electrode layer is formed on a side of the first insulating layer away from the first electrode layer, and an orthographic projection of the third metal strip on the base substrate is at least partially overlapped with an orthographic projection of the first metal strip on the base substrate, and an orthographic projection of the fourth metal strip on the base substrate is at least partially overlapped with an orthographic projection of the second metal strip on the base substrate.

15. The method of claim 14, wherein the orthographic projection of the third metal strip on the base substrate is completely overlapped with the orthographic projection of the first metal strip on the base substrate, and the orthographic projection of the fourth metal strip on the base substrate is completely overlapped with the orthographic projection of the second metal strip on the base substrate.

16. The method of claim 4, wherein forming the wire electrically connected with one of the first metal mesh pattern of the first electrode layer and the second metal mesh pattern of the second electrode layer by using the first metal stack and the second metal stack comprises:

performing a splicing exposure process on the first metal stack and the second metal stack by using a third mask to form the wire electrically connected with one of the first metal mesh pattern of the first electrode layer and the second metal mesh pattern of the second electrode layer, wherein the third mask comprises a wire pattern region, the wire pattern region comprises a first wire pattern portion and a second wire pattern portion which are opposite to each other, and a distance from an edge of the first wire pattern portion close to the second wire pattern portion to an edge of the second wire pattern portion close to the first wire pattern portion is greater than a width of the second exposure region of the second mask.

17. A substrate for forming a touch substrate, comprising:
a first electrode layer comprising a metal strip at an edge region of the first electrode layer and a first metal mesh pattern connected with the metal strip, and a second electrode layer at one side of the first electrode layer, the second electrode layer comprising a metal strip at an edge region of the second electrode layer and a second metal mesh pattern connected with the metal strip of the second electrode layer, the second metal mesh pattern being insulated from the first metal mesh pattern, and the metal strip of the first electrode layer being in direct contact with the metal strip of the second electrode layer to form a metal stack, wherein the metal stack is used for forming a wire electrically connected with one of the first metal mesh pattern of the first electrode layer and the second metal mesh pattern of the second electrode layer.

18. The substrate of claim 17, wherein the metal strip of the first electrode layer comprises first and second metal strips opposite to each other, and the first metal mesh pattern connects the first and second metal strips, the metal strip of the second electrode layer comprises third and fourth metal strips opposite to each other, and the second metal mesh pattern connects the third and fourth metal strips, the third metal strip is in direct contact with the first metal strip to form a first metal stack, and the fourth metal strip is in direct contact with the second metal strip to form a second metal stack, and the first metal stack and the second metal stack are used for forming the wire electrically connected with one of the first metal mesh pattern of the first electrode layer and the second metal mesh pattern of the second electrode layer.

19. The substrate of claim 17, wherein a width of a node of the first metal mesh pattern where the first metal mesh pattern is connected with the metal strip of the first electrode layer is greater than a width of each of metal lines arranged in a grid shape in the first metal mesh pattern, and a width of a node of the second metal mesh pattern where the second metal mesh pattern is connected with the metal strip of the second electrode layer is greater than a width of each of metal lines arranged in a grid shape in the second metal mesh pattern.

20. The substrate of claim 19, wherein a length of a node where the first metal mesh pattern is connected with the metal strip of the first electrode layer is greater than a length of a node where the second metal mesh pattern is connected with the metal strip of the second electrode layer, in a direction away from the metal strip of the first electrode layer and/or in a direction away from the metal strip of the second electrode layer.

21. The substrate of claim 18, further comprising:
a base substrate, on which the first electrode layer and the second electrode layer are; and
a first insulating layer between the first electrode layer and the second electrode layer, wherein an orthographic projection of the first insulating layer on the base substrate is at least partially overlapped with an orthographic projection of the first metal mesh pattern of the first electrode layer on the base substrate, and is not overlapped with orthographic projections of the first metal strip and the second metal strip of the first electrode layer on the base substrate,
wherein an orthographic projection of the third metal strip on the base substrate is at least partially overlapped with the orthographic projection of the first metal strip on the base substrate, and an orthographic projection of the fourth metal strip on the base substrate is at least partially overlapped with the orthographic projection of the second metal strip on the base substrate.

22. The substrate of claim 21, wherein the orthographic projection of the third metal strip on the base substrate is completely overlapped with the orthographic projection of the first metal strip on the base substrate, and the orthographic projection of the fourth metal strip on the base substrate is completely overlapped with the orthographic projection of the second metal strip on the base substrate.

23. A touch substrate, comprising:
a first electrode layer comprising a metal strip at an edge region of the first electrode layer and a first metal mesh pattern connected with the metal strip, and
a second electrode layer at one side of the first electrode layer, the second electrode layer comprising a metal strip at an edge region of the second electrode layer and a second metal mesh pattern connected with the metal strip, the second metal mesh pattern being insulated from the first metal mesh pattern, and the metal strip of the first electrode layer being in direct contact with the metal strip of the second electrode layer to form a metal stack,
wherein the metal stack comprises a wire electrically connected with one of the first metal mesh pattern of the first electrode layer and the second metal mesh pattern of the second electrode layer.

24. The touch substrate of claim 23, wherein the metal strip of the first electrode layer comprises first and second metal strips opposite to each other, and the first metal mesh pattern connects the first and second metal strips,
the metal strip of the second electrode layer comprises third and fourth metal strips opposite to each other, and the second metal mesh pattern connects the third and fourth metal strips, and
the third metal strip is in direct contact with the first metal strip to form a first metal stack, and the fourth metal strip is in direct contact with the second metal strip to form a second metal stack.

25. The touch substrate of claim 23, wherein a width of a node of the first metal mesh pattern where the first metal mesh pattern is connected with the metal strip of the first electrode layer is greater than a width of each of metal lines arranged in a grid shape in the first metal mesh pattern, and
a width of a node of the second metal mesh pattern where the second metal mesh pattern is connected with the metal strip of the second electrode layer is greater than a width of each of metal lines arranged in a grid shape in the second metal mesh pattern.

26. The touch substrate of claim 25, wherein the metal stack comprises a wire electrically connected with the first metal mesh pattern of the first electrode layer, and
a length of the node of the first metal mesh pattern where the first metal mesh pattern is connected with the metal strip of the first electrode layer is greater than a length of the node of the second metal mesh pattern where the second metal mesh pattern is connected with the metal strip of the second electrode layer, in a direction away from the metal strip of the first electrode layer and/or in a direction away from the metal strip of the second electrode layer.

27. The touch substrate of claim 24, further comprising:
a base substrate, on which the first electrode layer and the second electrode layer are; and
a first insulating layer between the first electrode layer and the second electrode layer, an orthographic projection of the first insulating layer on the base substrate is at least partially overlapped with an orthographic projection of the first metal mesh pattern of the first electrode layer on the base substrate, and is not overlapped with orthographic projections of the first metal strip and the second metal strip of the first electrode layer on the base substrate,
wherein an orthographic projection of the third metal strip on the base substrate is at least partially overlapped with the orthographic projection of the first metal strip on the base substrate, and an orthographic projection of the fourth metal strip on the base substrate is at least partially overlapped with the orthographic projection of the second metal strip on the base substrate.

28. The touch substrate of claim 27, wherein the orthographic projection of the third metal strip on the base substrate is completely overlapped with the orthographic projection of the first metal strip on the base substrate, and the orthographic projection of the fourth metal strip on the base substrate is completely overlapped with the orthographic projection of the second metal strip on the base substrate.

29. A touch device, comprising the touch substrate of claim 23.

* * * * *